United States Patent
Mutagi et al.

(10) Patent No.: US 10,924,571 B1
(45) Date of Patent: Feb. 16, 2021

(54) SENDING INFORMATION TO USERS

(71) Applicant: Amazon Technologies, Inc., Seattle, WA (US)

(72) Inventors: Rohan Mutagi, Redmond, WA (US); Trevor James Walker, Seattle, WA (US); Bo Li, Kenmore, WA (US); Jason Fam, Seattle, WA (US); Nuno Henriques De Jesus, Seattle, WA (US); Andrew Thomas, Seattle, WA (US); Philip Alexander Lee, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 23 days.

(21) Appl. No.: 16/176,797

(22) Filed: Oct. 31, 2018

(51) Int. Cl.
| H04L 29/08 | (2006.01) |
| G06N 3/04 | (2006.01) |
| G06N 3/08 | (2006.01) |
| G10L 15/22 | (2006.01) |
| G10L 15/26 | (2006.01) |

(52) U.S. Cl.
CPC .......... H04L 67/26 (2013.01); G06N 3/0445 (2013.01); G06N 3/08 (2013.01); H04L 67/2823 (2013.01); H04L 67/306 (2013.01); G10L 15/22 (2013.01); G10L 15/26 (2013.01)

(58) Field of Classification Search
CPC ... H04L 67/26; H04L 67/2823; H04L 67/306; G06N 3/08; G06N 3/0445; G10L 15/22; G10L 15/265
USPC ......................................................... 709/206
See application file for complete search history.

(56) References Cited

U.S. PATENT DOCUMENTS

| 8,881,020 B2 * | 11/2014 | Affronti ................. G06F 9/541 715/744 |
| 2002/0159387 A1 * | 10/2002 | Allison ................... H04L 12/66 370/229 |
| 2003/0014483 A1 * | 1/2003 | Stevenson ............... H04L 29/06 709/203 |
| 2004/0267941 A1 * | 12/2004 | Hodges .................. G06Q 30/02 709/228 |
| 2014/0195620 A1 * | 7/2014 | Srinivasan .............. H04L 51/14 709/206 |
| 2014/0337424 A1 * | 11/2014 | Lee ..................... H04L 63/0823 709/204 |
| 2014/0359026 A1 * | 12/2014 | Lefor ..................... H04L 51/14 709/206 |
| 2015/0237151 A1 * | 8/2015 | Lau ....................... G06F 16/951 709/206 |

FOREIGN PATENT DOCUMENTS

WO  WO-2016090421 A1 *  6/2016  ....... H04N 21/44218

* cited by examiner

*Primary Examiner* — Zi Ye
(74) *Attorney, Agent, or Firm* — Pierce Atwood LLP

(57) ABSTRACT

Techniques for decoupling data, sent by a data source, from how the data is sent to a user by a system are described. A system may include an application program interface (API) that enables a data source to simply provide data. The system may determine whether and how to send the data to a user(s) as a notification. The system may determine a modality by which to send the notification to the user. The system may use presence data to determine which device should be used to output the notification to the user. The system may cause the device to output the notification to the user using the modality.

24 Claims, 16 Drawing Sheets

FIG. 8

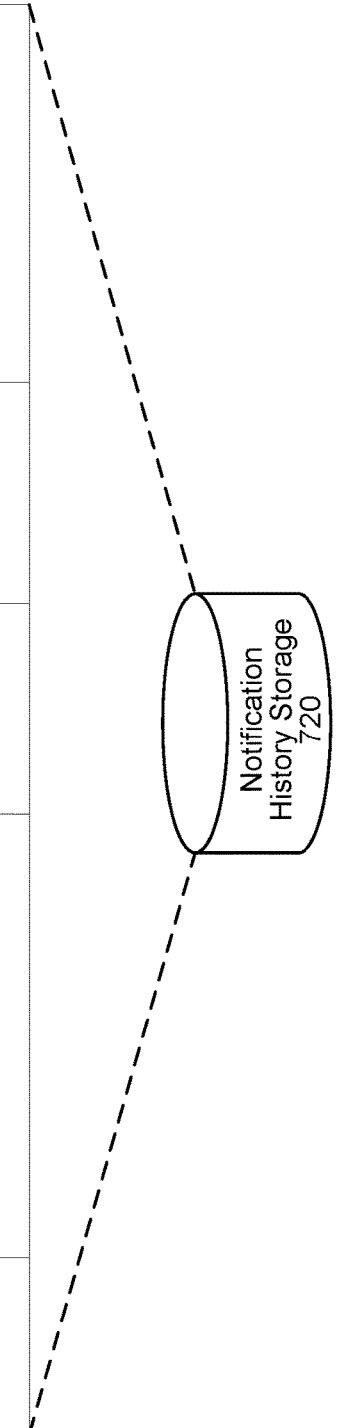

| User Identifier | Data Type | Modality | Time | User Performed Affirmative Action to View Notification? |
|---|---|---|---|---|
| ABC | VehicleArriving | SMS Message | Morning | Yes |
| ABC | DestinationArrivalTimeEstimate | Notification | Afternoon | No |
| BCD | NewsArticle | Email | Evening | Yes |
| CDE | SportsScoreUpdate | SMS Message; Notification | 10:00 am | Yes |
| CDE | ScoringPlayUpdate | Null Value | 3:30 pm | No |

Notification History Storage
720

SENDING INFORMATION TO USERS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech processing refers to the combination of speech recognition and natural language understanding processing techniques. Speech processing may also involve converting a user's speech into text data, which may then be provided to various text-based software applications.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 8 is a conceptual diagram illustrating an example record of previous notifications according to embodiments of the present disclosure.

DETAILED DESCRIPTION

Figure 1:
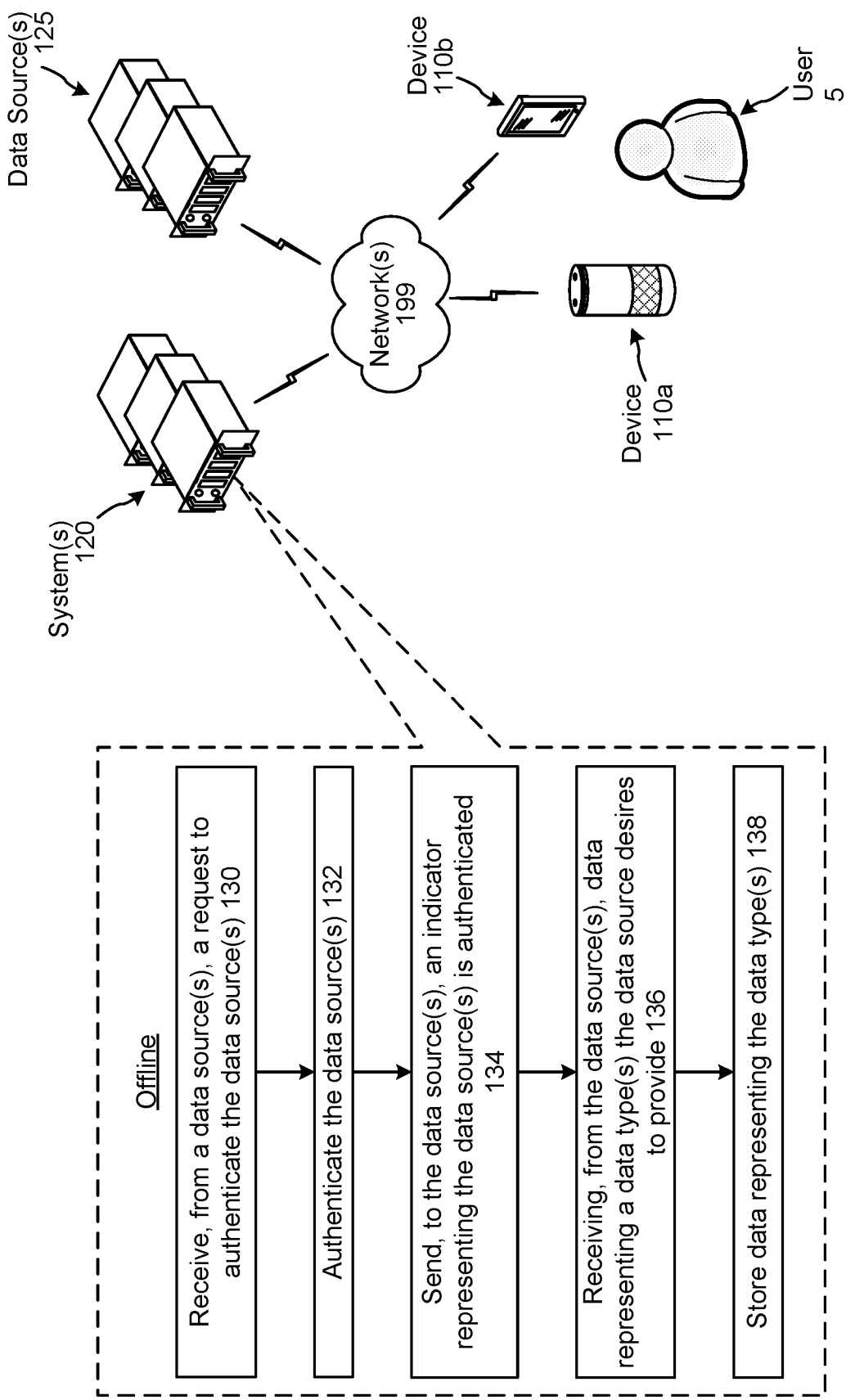
FIG. 1 illustrates a system configured to input information from a data source that will be able to send content to users through the system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may send content to users at the request of one or more data sources. Some content may not be specific to any particular user. For example, a news source may have an article, traffic update, weather update, or sports update that the news source desires be sent to various users of the system. Some content may be specific to a particular user. For further example, a ride sharing service may want the system to send a notification to a user that the user's ride is approaching (or has arrived at) a pickup location. Other content may be specific to a particular user, such as banking updates, medical reminders, etc.

A data source may be a skill that is validated with the system. A "skill" may be software running on the system that is akin to a software application running on a traditional computing device. That is, a skill may enable the system to execute specific functionality in order to perform an action (e.g., provide data in response to a user input, send content to one or more users, etc.).

A system may be configured to send content to users in a variety of manners. For example, the system may send content to users in the form of emails, short message service (SMS) messages, notifications (e.g., that are presented on a graphical user interface (GUI) of a user device, such as a smart phone), etc. Sending content to users in the form of a notification may include using a notification service that integrates with client device operations systems/applications, such as Amazon's Simple Notification Service, Google's Firebase Cloud Messaging, Apple's Push Notification Service, Microsoft's Windows Push Notification Services, etc.

The present disclosure improves such systems by decoupling a data source's ability to send data to the system from the data source's ability to cause the system to perform some action with respect to the data (e.g., send content to a user, perform a routine, etc.). Such decoupling reduces (or eliminates) a data source from potentially over-notifying a user.

As used herein, a "routine" refers to a defined set of actions that are performed in response to particular data. A user of a system may configure a routine. For example, a user may indicate that, when the system receives data representing a ride sharing service vehicle is approaching or at a pickup location, the system is to turn on a porch light corresponding to a house at the pickup location, lock one or more doors of the house, etc. Turning on the porch light and locking the door(s) corresponds to a "routine."

Such decoupling from the data source perspective is not detrimental because content to be sent to a recipient user is usually not dependent on how the content is, in fact, sent. For example, data indicating a ride sharing vehicle is arriving at a pickup location may be sent to a user a number of different ways, and none of the different ways may necessarily require the substance of the data to be changed.

A system may include an API that enables a data source to simply provide the system with data, which may include substantive content as well as a user identifier representing an intended recipient user. The system may determine whether and how to send the content to the user(s). Such is beneficial from the data source perspective because it enables a data source to send content to a user without the data source needing to dictate how to send the content. Moreover, such is beneficial from the data source perspective because it enables a data source to call an API once while leaving various content sending mechanisms available. This is in contrast to at least some present systems, which configure an API to receive a different API call for each mode of notification the data source desires to use for sending content.

A system implementing the present disclosure may require user permission to perform the teachings herein. That is, a system may require a user opt in, with informed consent, prior to the system being able to implement the teachings herein with respect to one or more users of a device(s). Such requirement of informed consent ensures, in at least some instances, that a system implementing the present disclosure complies with laws, regulations, standards, and the like governing where the system and/or device(s) are located. Such requirement also assists in maintaining transparency with users of the system regarding how information is used.

FIG. 1 illustrates a system configured to input information from a data source that will be able to send content to users through the system. Although the figures and discussion illustrate certain operational steps of the system in a particular order, the steps described may be performed in a different order (as well as certain steps removed or added) without departing from the intent of the disclosure. As illustrated in FIG. 1, the system may include one or more devices (110a/110b) local to one or more users 5, one or more systems 120, and one or more data sources 125 connected across one or more networks 199. The processes described with respect to FIG. 1 may be performed during offline operations. The data exchanged in FIG. 1 may be sent and received via a data source management API.

A data source(s) 125 may implement one or more skills. Such data source(s) 125 may correspond to a skill system(s) 1325. A "skill" may be software running on the skill system(s) 125 (and/or system(s) 120) that is akin to a software application running on a traditional computing device. That is, a skill may enable the skill system(s) 125 (and/or system(s) 120) to execute specific functionality in order to perform an action (e.g., send content to one or more users, etc.).

The system(s) 120 may need to authenticate a data source(s) 125 prior to the data source(s) 125 being able to provide the system(s) 120 with data (e.g., data that may be output by the system(s) 120 to one or more users, data that may cause a routine to be performed, etc.). The system(s) 120 may receive (130), from the data source(s) 125, a request to authenticate the data source(s) 125. If the data source(s) 125 is a skill system(s) 1325, the request may request authentication of a skill.

The system(s) 120 may authenticate (132) the data source(s) 125. For example, if the request is a request to verify a skill, the system(s) 120 may verify a developer of the skill, verify an invocation name of the skill, and/or verify other information related to the skill. The system(s) 120 may assign a specific identifier to the data source(s) 125. After authenticating the data source(s) 125, the system(s) 120 may send (134), to the data source(s) 125, an indicator representing the data source(s) 125 has been authenticated. In at least some examples, the indicator may include the data source(s) 125's specific identifier.

The data source(s) 125 may desire to send various types of data to the system(s) 120. For example, a data source(s) 125 may correspond to a ride sharing service that desires to send data indicating a vehicle is arriving (or has arrived) at a pickup location, data indicating a destination arrival time estimate, etc. The system(s) 120 may receive (136), from the data source(s) 125, data representing one or more types of data the data source(s) 125 desires to send to the system(s) 120. The system(s) 120 may store (138) data representing the data type(s). For example, the system(s) 120 may associate, in storage, the data source(s) 125's identifier with each data type (or indicator of data type) to be provided by the data source(s) 125. An illustration of such data is provided in FIG. 4.

Figure 5:
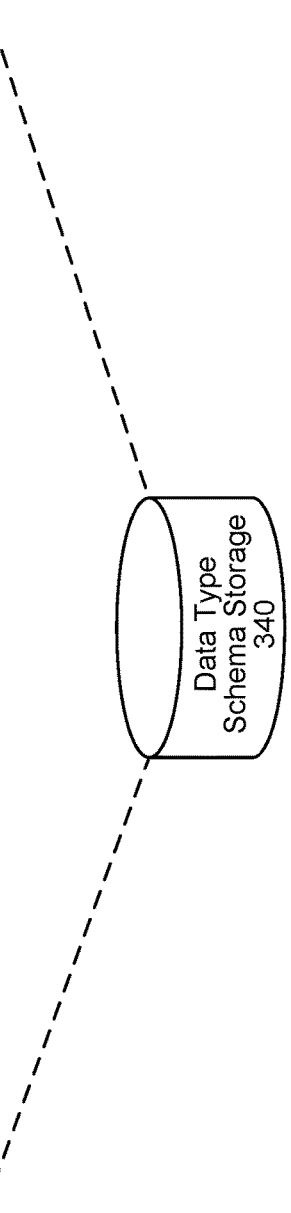
FIG. 5 is a conceptual diagram illustrating data types with associated metadata according to embodiments of the present disclosure.

In at least some implementations, the system(s) 120 may be configured with data types and corresponding metadata that represent data that may be ingested by the system(s) 120. FIG. 5 illustrates example data types and corresponding metadata. As illustrated in FIG. 5, some data types may require a user identifier while the user identifier may be optional with respect to other data types. The data types that do not indicate the user identifier may be used to send content to various users of the system, or perform one or more other actions with respect to various users of the system (as described in detail herein below). The system(s) 120 may send data representing data types (supported by the system(s) 120) to the data source(s) 125 prior to the system(s) 120 receiving the data representing the data type(s) the data source(s) 125 desires to provide (received at step 136).

In at least some implementations, the data source(s) 125 may configure data types and corresponding metadata. This enables the data source(s) 125 to have greater control over the data provided by the data source(s) 125 to the system(s) 120. In such implementations, the data source(s) 125 could send, to the system(s) 120, data representing the data source(s) 125's identifier, one or more data types, and corresponding types of metadata. The system(s) 120 could store such data at step 138.

Figure 2:
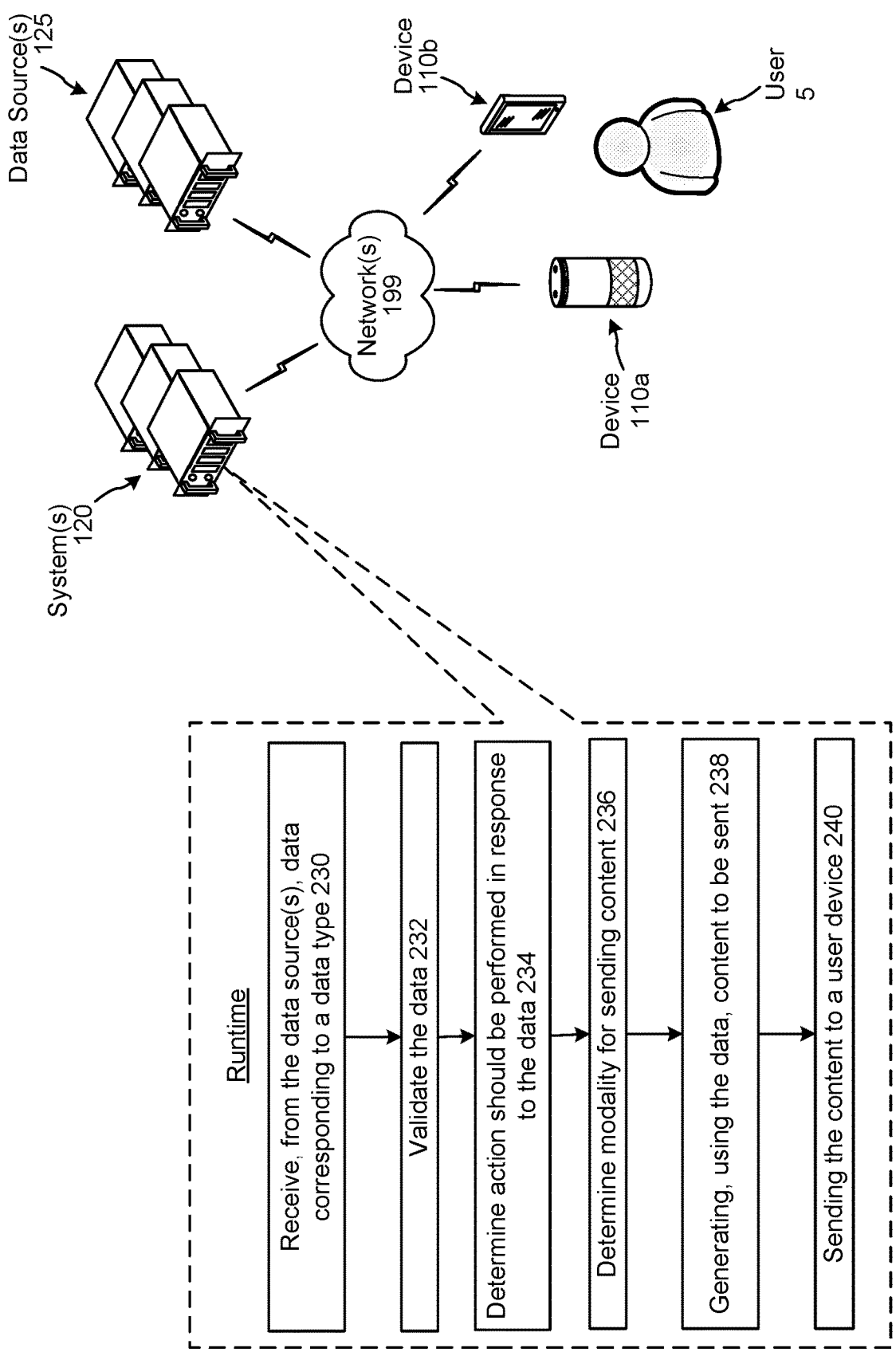
FIG. 2 illustrates a system configured to receive data from a source and perform an action based on the data according to embodiments of the present disclosure.

After performance of the processes described with respect to FIG. 1, the data source(s) 125 may send data to the system(s) 120 (as illustrated in FIG. 2). The system(s) 120 may receive (230), from a data source(s) 125, data corresponding to a data type.

The system(s) 120 may validate (232) the data. The system(s) 120 may validate that the data source(s) 125, from which the data was received, has been authenticated by the system(s) 120 to provide data to the system(s) 120. The system(s) 120 may also or alternatively validate that the data source(s) 125 is permitted to send data of the type received at step 230. Such validation may include determining data type to which the present data corresponds and determining the data type is associated with the data source(s) 125's identifier in storage. The system(s) 120 may also or alternatively validate that a payload of the data received at step 230 conforms to the data type's schema. Each data type may be associated schema defining particular types of metadata that must be present in order for a data of that type to be ingested by the system(s) 120.

If the system(s) 120 cannot validate the data, the system(s) 120 may cease processing with respect to the data received at step 230, and may optionally send data to the data source(s) 125, with the data representing the ceasing of processing. If, on the other hand, the system(s) 120 validates the data, the system(s) 120 may determine (234) an action should be performed in response to the data. Such action may correspond to sending content (representing the data) to one or more users, performing a routine, etc. One skilled in the art will appreciate that not some received data may not result in such actions being performed (e.g., data representing content to be stored by the system(s) 120 and output in response to user commands). The system(s) 120 may determine whether an action should be performed based on the type of the received data (received at step 230).

If the system(s) 120 determines an content should be output to a user, the system may determine (236) a modality for sending the content. Illustrative modalities include email, SMS message, notification, etc. The system(s) 120 may determine the modality using user preferences and/or presence detection data.

The system(s) 120 may generate (238), using the data received at step 230, content to be sent to the user 5. The content to be sent may include audio data and/or text data representing the data received at step 230.

The system(s) 120 may send (240) the content to a user device (110a/110b). The system(s) 120 may send the content proactively (e.g., not in response to a user input requesting the content be output). The user device (110a/110b) may output audio and/or text (representing the content) to the user 5.

As described with respect to FIG. 2, the system(s) 120 has control over whether content is sent to a user. Such prevents data sources from providing users with content in unbeneficial manners.

Certain systems may include an API that enables a data source to send content to users in a variety of manners. The API may associate each manner of sending content with a different, respective type of API call. For example, an API call to send a notification may correspond to "Notifications.Notify(UserIdentifier, message)." For further example, an API call to send an email may correspond to "Emails.Email (UserIdentifier, message)."

In certain systems, if a data source wants to enable different manners of sending content to users, the data source may need to integrate with different APIs configured by the system. For example, if a ride sharing service wants to enable SMS messages, emails, and notifications, the ride sharing service may need to integrate with a SMS API for send SMS messages, an email API to send emails, and a notifications API to send notifications. This may result in an unbeneficial situation for the data source in that the data source may need to call various APIs to send the same content using more than one modality. As used herein, "modality" refers to an SMS message, phone call, application notification, device buzz (e.g., a ping to a smart watch), email, or other manner in which to send content to a one or more users.

Figure 3:
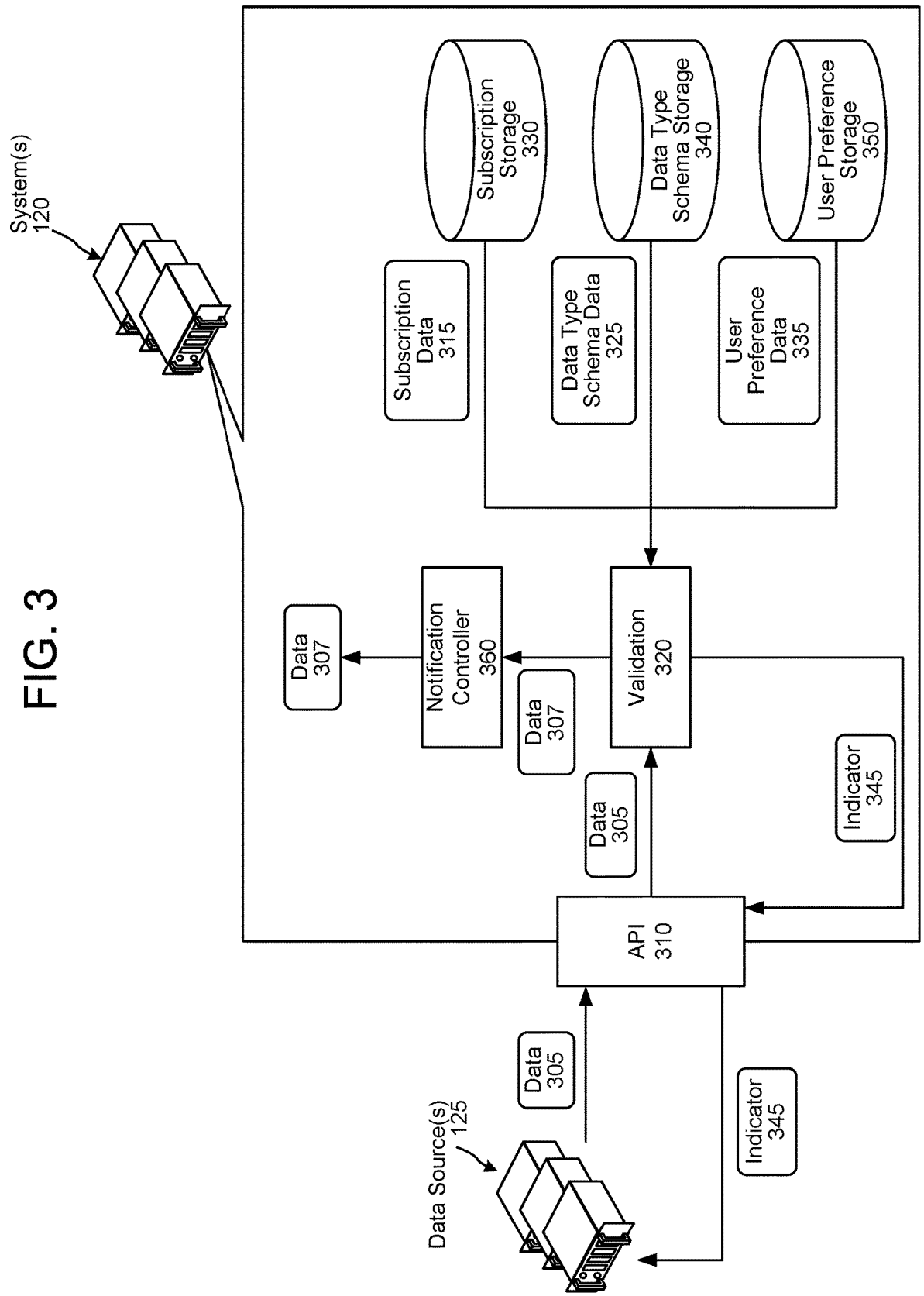
FIG. 3 is a system flow diagram illustrating how receipt of an API call and data validation processing may be performed according to embodiments of the present disclosure.

The system(s) 120 of the present disclosure may include an API 310 that receives data from various data sources 125 (as illustrated in FIG. 3). That is, regardless of the number of data sources 125 permitted to send data to the system(s) 120, each may send data to the API 310.

The system(s) 120 may include a validation component 310 that receives data 305 from the API 310. The validation component 320 may validate various aspects of the data 305.

Figure 4:
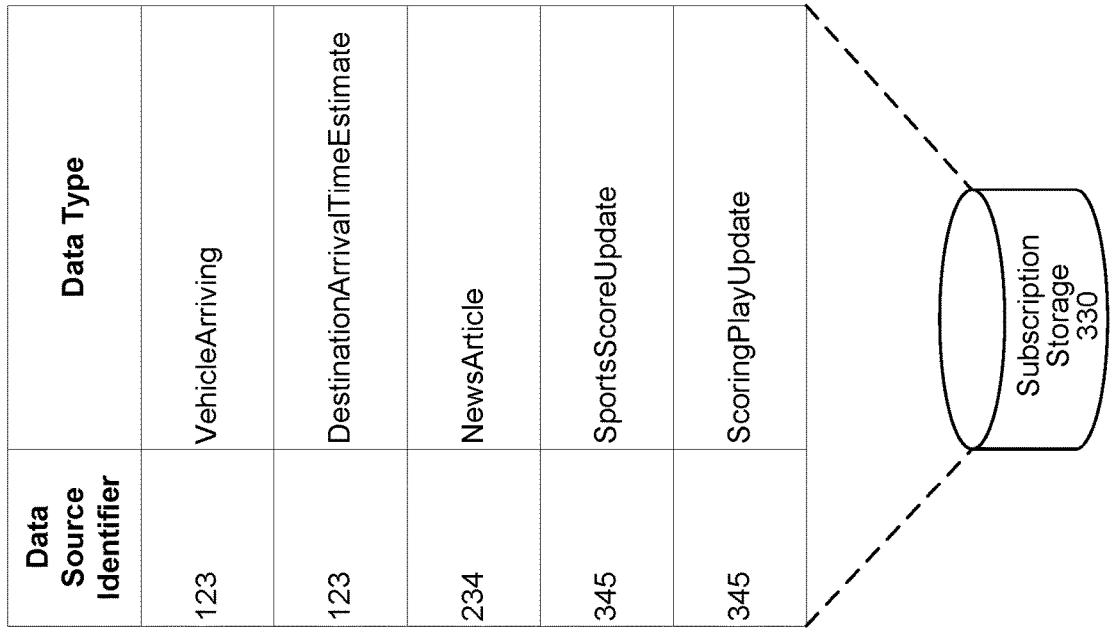
FIG. 4 is a conceptual diagram illustrating how data types, supported by a data source, may be stored according to embodiments of the present disclosure.

The system(s) 120 may include a subscription storage 330 in communication with the validation component 320. The subscription storage 330 may store data (e.g., data source identifiers) representing data sources 125 authenticated to send data to the system(s) 120. Each data source identifier in the subscription storage 330 may be associated with particular data types that the corresponding data source(S) 125 is permitted to send. Such data types may correspond to the data types received at step 136. Such data of the subscription storage 330 is illustrated in FIG. 4.

The validation component 320 may identify a data source identifier represented in (or associated with) the data 305. The data source identifier corresponds to the data source(s) 125 that originated the data 305. The validation component 320 may query the subscription storage 330 for subscription data 315 associated with the data source identifier. The subscription data 315 may represent the data source identifier is not represented in the subscription storage 330. This may occur if the data source(s) 125 has not been authenticated to provide data to the system(s) 120. When this occurs, the validation component 320 determines the data source(s) 125 is not permitted to send the data 305 to the system(s) 120.

If the data source(s) 125 has been authenticated, the subscription data 315 may represent one or more data types the data source(s) 125 has indicated the data source(s) 125 supports (as received at step 136). The validation component 320 may identify a data type (or indicator thereof) represented in the data 305. If the validation component 320 determines the data type, represented in the data 305, is represented in the subscription data 315, the validation component 320 validates that the data source(s) 125 is permitted to send the data 305 to the system(s) 120. If the validation component 320 determines the data type, represented in the data 305, is not represented in the subscription data 315, the validation component 320 determines the data source(s) 125 is not permitted to send the data 305 to the system(s) 120.

As described above, the validation component 320 may query the subscription storage 330 for subscription data 315 representing all data types associated with the data source identifier. Alternatively, the validation component 320 may query the subscription storage 330 for subscription data 315 representing whether the data source(s) 125 has indicated it supports the data type represented in the data 305. If the validation component 320 determines the subscription data 315 represents the data source(s) 125 has indicated it supports the data type, the validation component 320 validates that the data source(s) 125 is permitted to send the data 305 to the system(s) 120. If the validation component 320 determines the subscription data 315 represents the data source(s) 125 has not indicated it supports the data type, the validation component 320 determines the data source(s) 125 is not permitted to send the data 305 to the system(s) 120.

The system(s) 120 may include a data type schema storage 340. The data type schema storage 340 may include data representing data types supported by the system(s) 120. Each data type may be associated with particular metadata that may be required in order for the system(s) 120 to ingest data of the type. Such data of the data type schema storage 340 is illustrated in FIG. 5.

The validation component 320 may query the data type schema storage 340 for data type schema data 325 associated with the data type represented in the data 305. The data type schema data 325 may represent metadata, associated with the data type, that may be required for the system(s) 120 to ingest the data 305. The validation component 320 may determine whether metadata in the data 305 corresponds to the metadata represented in the data type schema data 325. If the validation component 320 determines the metadata in the data 305 corresponds to the metadata represented in the data type schema data 325, the validation component 320 validates that the data source(s) 125 is permitted to send the data 305 to the system(s) 120. If the validation component 320 determines the metadata in the data 305 does not correspond to the metadata represented in the data type schema data 325 (e.g., the metadata in the data 305 is missing metadata represented in the data type schema data 325), the validation component 320 determines the data source(s) 125 is not permitted to send the data 305 to the system(s) 120.

Each user of the system(s) 120 may have one or more preferences regarding the types of data the user desires to receive. A user may provide such preference(s) via a graphical user interface (GUI) or a voice user interface (VUI) of a device 110. The device 110 may send data representing the preference(s) to the system(s) 120, for example via a companion application. The system(s) 120 may receive the data via a data source management API of the system(s) 120.

A user's preference with respect to a particular data type may be data source agnostic. In other words, a user may not care about what data source is capable of originating the particular data type; all the user cares about is receiving data corresponding to the particular data type. For example, such a preference may represent a user would like to receive VehicleArriving data from any data source that is capable of generating data corresponding to the VehicleArriving type.

A user preference with respect to a particular data type may be data source specific. For example, the system(s) 120 may include (or be in communication with) multiple data sources that are capable of generating data corresponding to the VehicleArriving type. However, a user may indicate the user desires to receive VehicleArriving data from one of the data sources, but may not indicate the user desires to receive VehicleArriving data from the other data sources. An illustration of the foregoing user preferences is provided in FIG. 6.

When the system(s) 120 receives a data source-agnostic or data source-specific preference as described above, the system(s) 120 may send data, representing the preference, to a data source(s) 125. Such data indicates to the data source that the data source is now able to send data, corresponding to the user preference, to the system(s) 120. Such data may be sent from the system(s) 120 to the data source(s) 125 via a skill management API of the system(s) 120.

Figure 6:
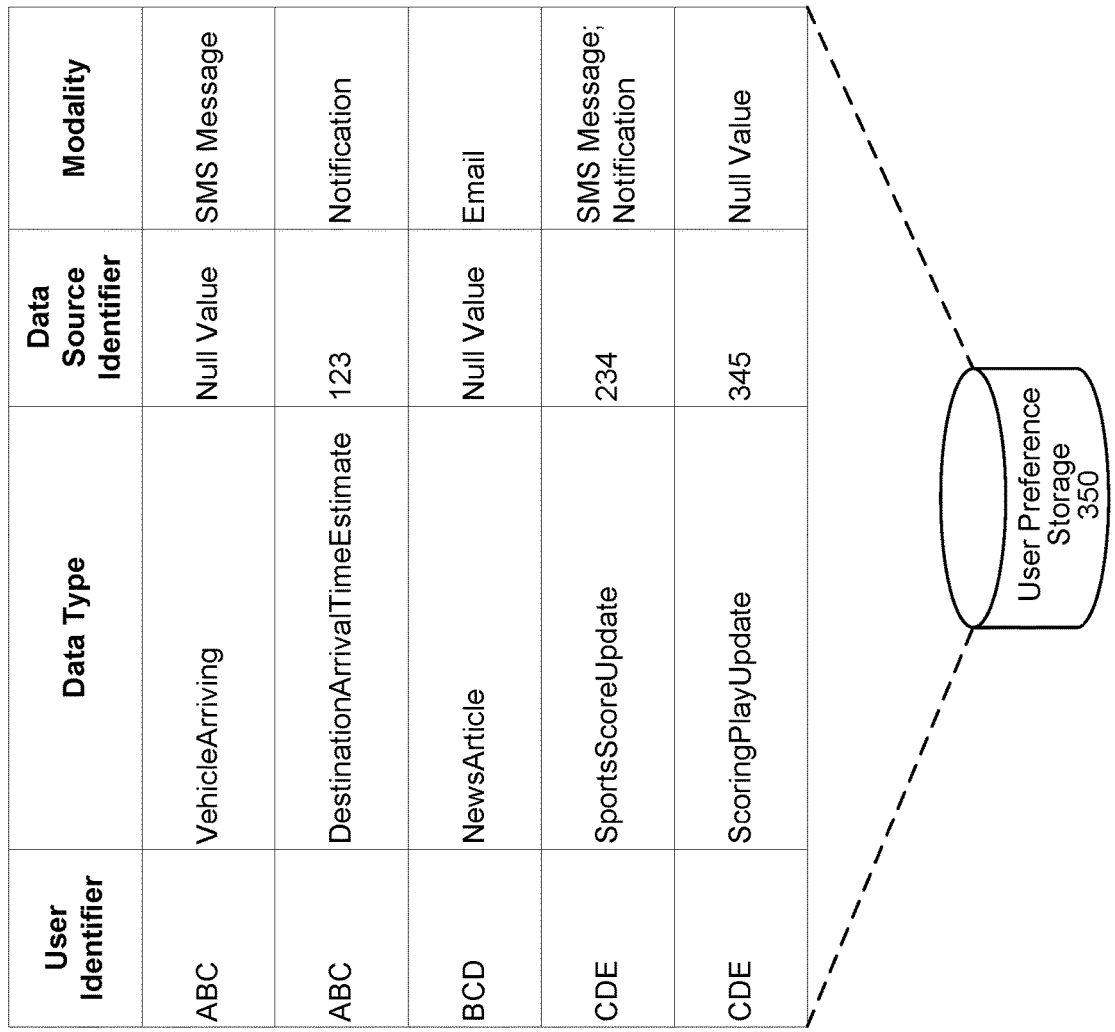
FIG. 6 is a conceptual diagram illustrating how user preferences regarding data types may be stored according to embodiments of the present disclosure.

Referring to FIG. 3, the system(s) 120 may include a user preference storage 350 storing the data represented in FIG. 6, and potentially other types of user data. The validation component 320 may identify a user identifier represented in the data 305. The validation component 320 may query the user preference storage 350 for user preference data 335 associated with the user identifier 335.

The validation component 320 may determine whether the user preference data 335 includes the data type (corresponding to the data 305) and optionally includes the data source identifier (corresponding to the data source(s) 125 that originated the data 305). In other words, the validation component 320 may determine whether the user preference data 335 represents the user (corresponding to the user identifier) has indicated the user wants to receive data corresponding to the data type, and optionally wants to receive data of the data type from the data source(s) 125 that originated the data 305.

If the validation component 320 determines the user preference data 335 represents the user (associated with the user identifier) has indicated the user wants to receive data corresponding to the data 305, the validation component 320 validates that the data source(s) 125 is permitted to send the data 305 to the system(s) 120. If the validation component 320 determines the user preference data 335 does not indicate the user wants to receive data corresponding to the data 305, the validation component 320 determines the data source(s) 125 is not permitted to send the data 305 to the system(s) 120.

If all processing performed by the validation component 320 represents the data source(s) 125 is permitted to send the data 305 to the system(s) 120, the validation component 320 may output data 307 for further downstream processing. The data 307, output by the validation component 320, may be substantively identical to the data 305 input to the validation component 320, yet may have a different appearance. For example, the data 305 may represent content in a first format (e.g., that may be published to the system(s) 120 by the data source(s) 125) and the data 307 may represent the same content in a second format (e.g., that may be processed by downstream components as described below).

Alternatively, if at least some of the processing performed by the validation component 320 represents the data source(s) 125 is not permitted to send the data 305 to the system(s) 120, the validation component 320 may not output the data 307 for further downstream processing.

In conjunction with not outputting the data 307 for further downstream processing, the validation component 320 may send an indicator 345 to the API 310. The indicator 345 may include (or be associated with) the data source identifier, representing the data source(s) 125 that originated the data 305. The indicator 345 may represent the validation component 305 has prevented the data 305 from being output for further downstream processing. The indicator may represent a reason(s) why the validation component 305 has prevented the data 307 from being output for further downstream processing. The API 310 may direct the indicator 345 to the data source(s) 125 associated with the data source identifier represented in (or associated with) the indicator 345.

As illustrated, the data source(s) 125 may be in communication with, but not configured as part of, the system(s) 120. One skilled in the art will appreciate that the data source(s) 125 may be implemented as part of the system(s) 120.

Figure 7:
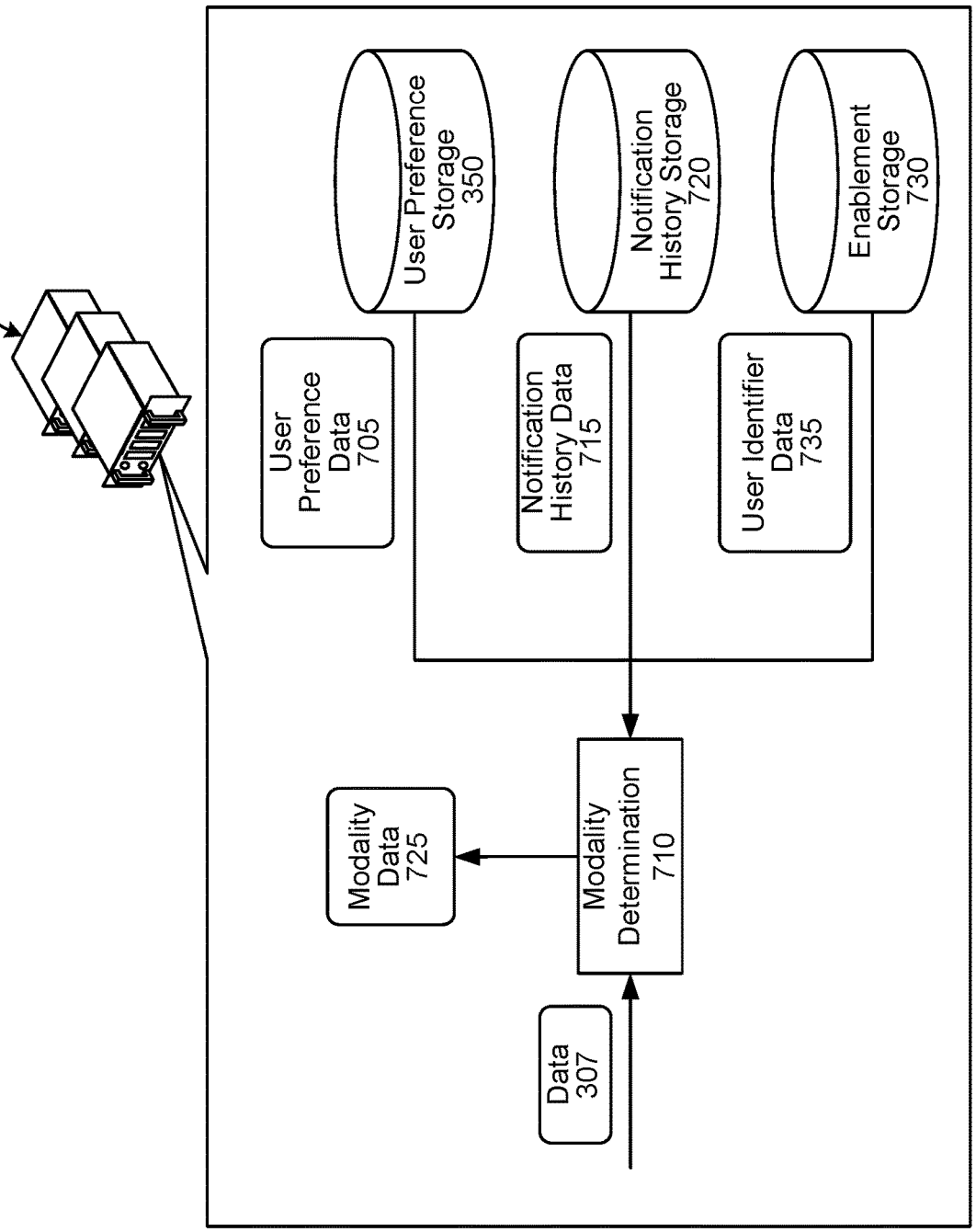
FIG. 7 is a system flow diagram illustrating how a modality for sending data to a user may be determined according to embodiments of the present disclosure.

The data 307, output by the validation component 320, may be input to a notification controller 360. The notification controller 360 determines, based on the data 307, whether the data 307 should be stored for later response to one or more user commands, or whether the data 307 should be output to one or more users of the system(s) 120. Such determination may be premised, at least in part, on the data type. For example, the notification controller 360 may determine data corresponding to a type representing an event (e.g., data corresponding to a news story, data corresponding to a sports score update, data representing a ride sharing vehicle is arriving at a pickup location) should be output to a user whereas data not corresponding to an event (e.g., data representing a joke, data representing information about a particular individual, or other data that may traditionally be output in response to user commands) should not be output to a user. If the notification controller 360 determines the data 307 should not be output to a user, the notification controller 360 may cause the data 307 to be stored for later use in responding to user inputs. If the notification controller 360 determines the data 307 should be output to a user, the notification controller 360 may cause the data 307 to be sent to a modality determination component 710 (as illustrated in FIG. 7).

The modality determination component 710 may determine a most appropriate modality for outputting the data 307 to an intended recipient user(s). Example modalities include email, SMS message, a GUI notification (e.g., to be displayed as a "badge" on a smart phone or tablet display), a VUI notification, etc. The modality determination component 710 may output modality data 725 representing the modality that should be used to output the data 307.

The modality may be determined, based at least in part, on user preference. A user preference (whether data source(s) agnostic or data source(s) specific) may indicate, for a particular data type, one or more preferred modalities for outputting data. Some user preferences may not indicate a preferred modality. FIG. 6 illustrates such user preferences.

The modality determination component 710 may query the user preference storage 350 for user preference data 705 associated with the user identifier, represented in the data 307, as well as the data type to which the data 307 corresponds. If the user preference storage 350 includes a modality preference(s) associated with the user identifier and the data type, the user preference data 705 may indicate such. If the user preference storage 350 does not include a modality preference associated with the user identifier and the data type, the user preference data 705 may indicate such.

If the modality determination component 710 determines the user preference data 705 represents a single preferred modality, the modality determination component 710 may determine the data 307 is to be output using the preferred modality. If the modality determination component 710 determines the user preference data 705 represents more than one preferred modality, the modality determination component 710 may determine which of the preferred modalities to use to output the data 307. If the modality determination component 710 determines the user preference data 705 does not represent a preferred modality, the modality determination component 710 may determine a modality, supported by the system(s) 120, to use to output the data 307.

The system(s) 120 may include a notification history storage 720 that stores information regarding previous notifications and corresponding user action. For example, each notification, represented in the notification history storage 720, may be associated with a user identifier corresponding to a user that received the notification, a modality used to output the notification, and information representing whether the user performed an affirmative act to view the notification. FIG. 8 illustrates example data that may be stored in the notification history storage 720.

In at least some examples, the modality determination component 710 may consider notification history data, received from the notification history storage 720, in determining which modality to use. The modality determination component 710 may query the notification history storage 720 for notification history data 715 associated with the user identifier (represented in the data 307). In some examples, the modality determination component 710 may query the notification history storage 720 for notification history data 715 that is associated with both the user identifier and the data type to which the data 307 corresponds.

The modality determination component 710 may use the notification history data 715 to determine the modality to use to send the data 307 to the user. For example, the modality determination component 710 may determine to send the data 307 as an email if the notification history data 715 indicates the user has affirmatively viewed emails in the past. For further example, the modality determination component 710 may determine not to send the data 307 as an email if the notification history data 715 indicates the user has not affirmatively viewed emails in the past. Other examples are also possible.

The notification history data 715 may include, for each previous notification represented therein, a time of day that the notification was sent to the user. The time may be a binned time (e.g., morning, afternoon, evening) or a specific time (e.g., 10:00 am, 3:30 pm, etc.). The modality determination component 710 may determine the modality based on a present time. For example, the modality determination component 710 may determine the data 307 should be output as an email if the notification history data 715 represents the user has affirmatively viewed emails sent to the user at a previous time corresponding to the present time. For further example, the modality determination component 710 may determine not to send the data 307 as an email if the notification history data 715 represents the user has not affirmatively viewed p emails sent to the user at a previous time corresponding to the present time.

The modality determination component 710 may determine the modality based on a present time in conjunction with the data type corresponding to the data 307. For example, the modality determination component 710 may determine the data 307 should be output as an email if the notification history data 715 represents the user has affirmatively viewed emails that corresponded to the data type and that were sent to the user at a previous time corresponding to the present time. For further example, the modality determination component 710 may determine not to send the data 307 as an email if the notification history data 715 represents the user has not affirmatively viewed emails that corresponded to the data type and that were sent to the user at a previous time corresponding to the present time.

As described above, the data 307 may represent content intended for a particular user (e.g., such as VehicleArriving data, DestinationArrivalTimeEstimate data, etc.). Such data 307 may include a user identifier corresponding to the intended recipient user.

Some data 307 may not be intended for any particular user, but may be intended to be sent to various users of the system(s) 120 (e.g., broadcast to various users of the system(s) 120). Such data 307 may include NewsArticle data, SportsScoreUpdate data, ScoringPlayUpdate data, etc. Such data 307 may not include any particular user identifier. Such data 307 may be intended for all users that have subscribed to the data source(s) 125 that originated the data 307. Such data 307 may correspond to news service wanting to send a news article to its subscribers, a sports service wanting to send a score update to its subscribers, etc. When a user subscribes to (or enables) a data source(s) 125, the user has provided the system(s) 120 with permission to send, to that user, data originating from the data source(s) 125. The following processes of the modality determination component 710 prevent the data source(s) 125 from needing to send different data to the API 310, whereby the only difference between the may be that each data may include a different user identifier but the same content.

Figure 9:
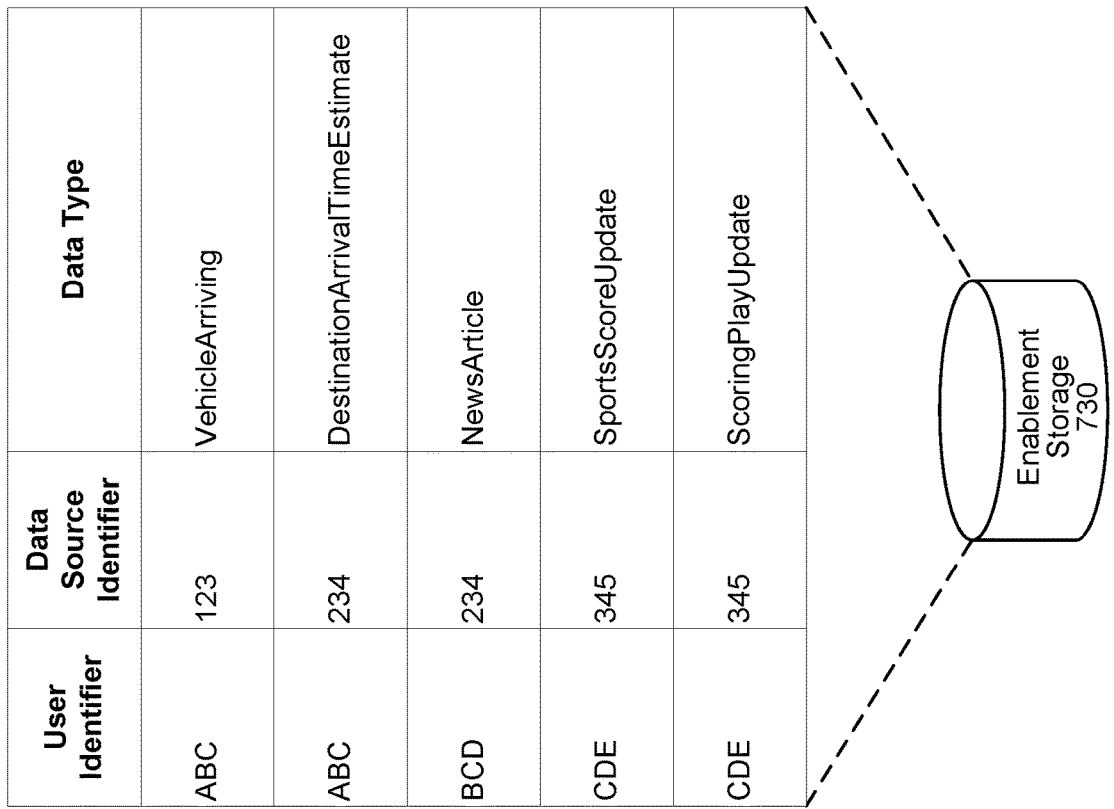
FIG. 9 is a conceptual diagram illustrating an example how data source enablement may be recorded according to embodiments of the present disclosure.

The system(s) 120 may include an enablement storage 730 that stores information regarding various system(s) 120 users and the data sources the users have enabled. For example, a user identifier may be associated with a data source identifier representing a data source the user has enabled. A user identifier may be associated with more than one data source identifier. As described with respect to FIG. 6, a user may indicate a data type the user wants to receive without indicating a particular a data source. When a user enables a data source, the system(s) 120 may determine if the user has indicated they want to receive a data type that may be originated by the newly enabled data source. If the system(s) 120 determines the user has provided such an indication, the system(s) 120 may associate the user identifier and data source identifier with the permitted data type. FIG. 9 illustrates examples of the aforementioned described data that may be stored in the enablement storage 730.

When the modality determination component 710 receives data 307 that does not include a particular user identifier, the modality determination component 710 may determine a data source identifier representing the data source(s) 125 that originated the data 305. The modality determination component 710 may also identify, in the data 307, a data type. The modality determination component 710 may query the enablement storage 730 for user identifier data 735 representing user identifiers associated with the data source identifier and data type in the enablement storage 730 (e.g., corresponding to users that have enabled the data source and have indicated they want to receive notifications corresponding to the data type). The modality determination component 710 may thereafter perform the aforementioned modality determination processes with respect to each user identifier represented in the user identifier data 735. The modality determination component 710 may output respective modality data 725 for each user identifier represented in the user identifier data 735.

The modality determination component 710 (or another component of the system(s) 120) may selectively "broadcast" notifications to a subset of users that have subscribed to a particular data source(s) 125. Such selective output of notifications may be based on location. For example, if the data 307 represents a news article corresponding to a specific geographic location, the modality determination component 710 (or another component of the system(s) 120) may only generate modality data for user identifiers corresponding to the geographic location.

Over time, the system(s) 120 may be configured to support different notification modalities. When a data source becomes configured to send data using the system(s) 120, the system(s) 120 may support certain notification modalities. Thereafter, when the data source sends data to the system(s) 120, the system(s) 120 may support one or more additional notification modalities (or may no longer support one or more notification modalities that the system(s) 120 supported when the data source became configured with the system(s) 120). By not requiring the data source to indicate which modality to use and by configuring the system(s) 120 to determine the modality to be used, a notification may be sent using a modality that did not become supported by the system(s) 120 until after the data source became configured with the system(s) 120. Such configuration provides significantly scalability.

The modality determination component 710 may consider presence data (as provided by a presence detection component 1120 described below) when determining a modality. A user may set rules that indicate specific modalities that should not be used to send notifications to the user. The modality determination component 710 may determine (using presence data) the user is proximate to a device. The modality determination component 710 may determine the user has set a rule that a modality (corresponding to the device) should not be used. After making such a determination, the modality determination component 710 may eliminate the modality from consideration.

The modality determination component 710 may consider the data type (of the data 307) when determining the modality. Different data types may be assigned different levels of importance. The modality determination component 710 may determine the modality based on the data type's level of importance. For example, if the data type corresponds to highly important, the modality determination component 710 may determine a modality that is likely to present the notification to the user relatively quickly (e.g., a notification that is displayed as a badge on a mobile device). For further example, if the data type corresponds to less important, the modality determination component 710 may determine a modality that may present the notification to the user slower (e.g., email).

Figure 10:
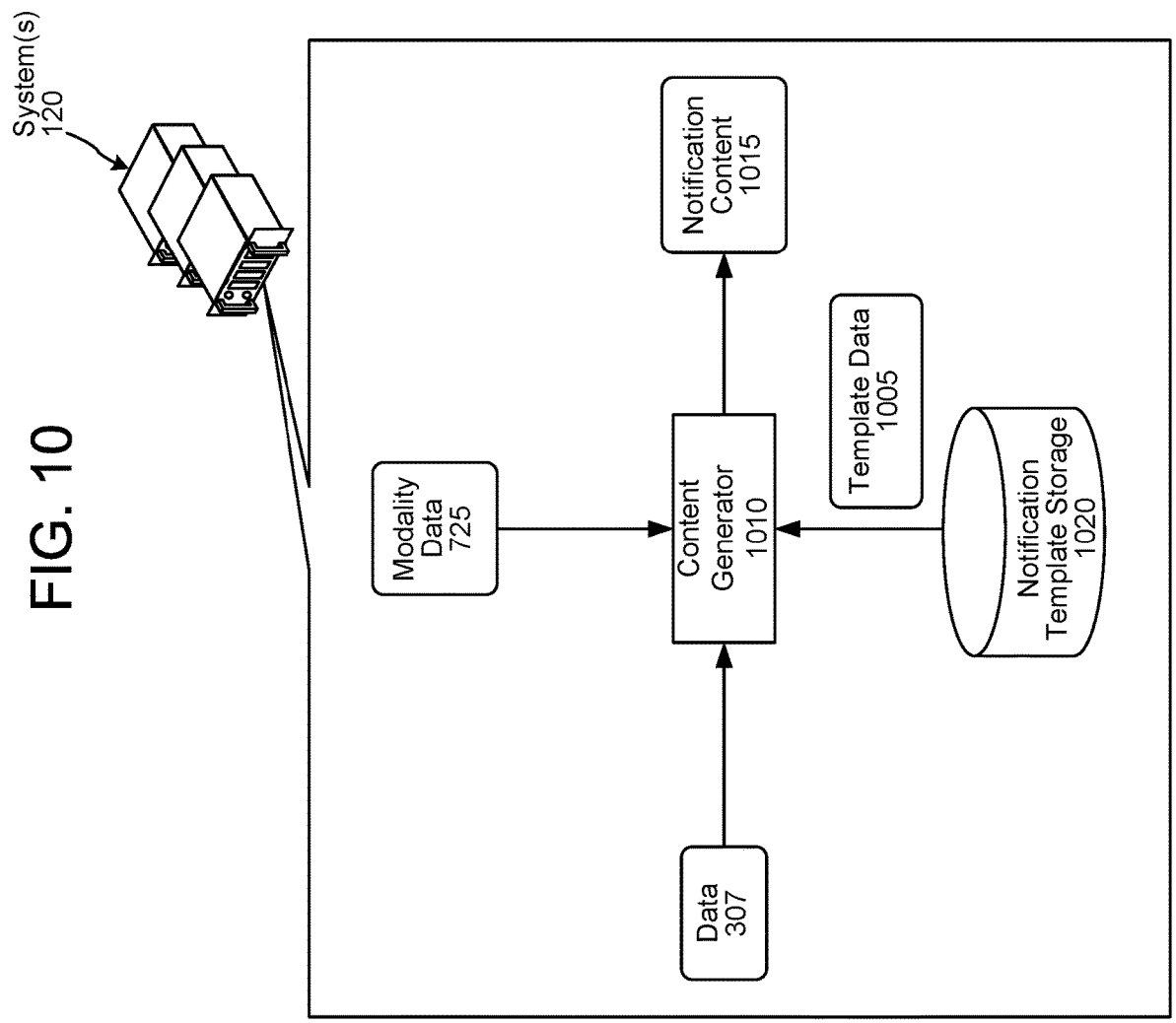
FIG. 10 is a system flow diagram illustrating how content, for output to a user, may be generated from a notification according to embodiments of the present disclosure.

The system(s) 120 may include a content generator 1010 configured to render content of data 307 into content that may be deliverable to a user (as illustrated in FIG. 10). The content generator 1010 may identify a template associated with the data type. A template may include data fields that may be populated with information of the data 307 to generate content to be presented to a user. The content generator 1010 may render the template to include content represented in the data 307. If the modality determination component 710 determines the data 307 is intended for multiple users, the content generator 1010 may receive data 307 and associated modality data 725 for each user identifier. As such, the below described processing of the content generator 1010 may be performed with respect to one or more than one notification.

The system(s) 120 may include a notification template storage 1020. The notification template storage 1020 may include data representing various data types. Each data type may be associated with a corresponding template for outputting notification content. For example, a template may dictate how output audio is to be configured for a particular data type, how output text is to be configured for a particular data type, etc.

The content generator 1010 may receive the data 307 and may determine the data type corresponding to the data 307. The content generator 1010 may receive the modality data 725 representing the modality that should be used to output the notification. The content generator 1010 may query the notification template storage 1020 for template data 1005 associated with the data type and the modality. For example, if the modality corresponds to output via a GUI, the template data 1005 may indicate how to configure text corresponding to the data type. For further example, if the modality corresponds to output via a VUI, the template data 1005 may indicate how to configure audio corresponding to the data type. In another example, if the modality corresponds to output via a GUI and a VUI, the template data 1005 may indicate how to configure text and audio corresponding to the data type. The content generator 1010 uses the template data 1005 to reconfigure (if necessary) the substantive content (represented in the data 307) for appropriate/desired output as a notification to a user. The content generator 1010 may output notification content 1015 representing the substantive notification. For example, the notification content 1015 may correspond to "your driver John is outside" if the substantive content of the data 307 corresponds to: [Driver Name: John]; [Arrival: Now]. For further example, the notification content 1015 may correspond to "your driver John will be outside in five minutes" if the substantive content of the data 307 corresponds to: [Driver Name: John];

[Arrival: Five Minutes]. Other examples are also possible. The notification content 1015 may be input to a TTS component of the system(s) 120 if the notification content 1015 is text data and the modality data 725 represents the notification content 1015 is to be output as audio via a VUI.

As described, the content generator 1010 may perform processing with respect to various notifications (e.g., when the data 307 is intended for various users). In such situations, the content generator 1010 may output respective notification content 1015 for each user identifier.

Figure 11:
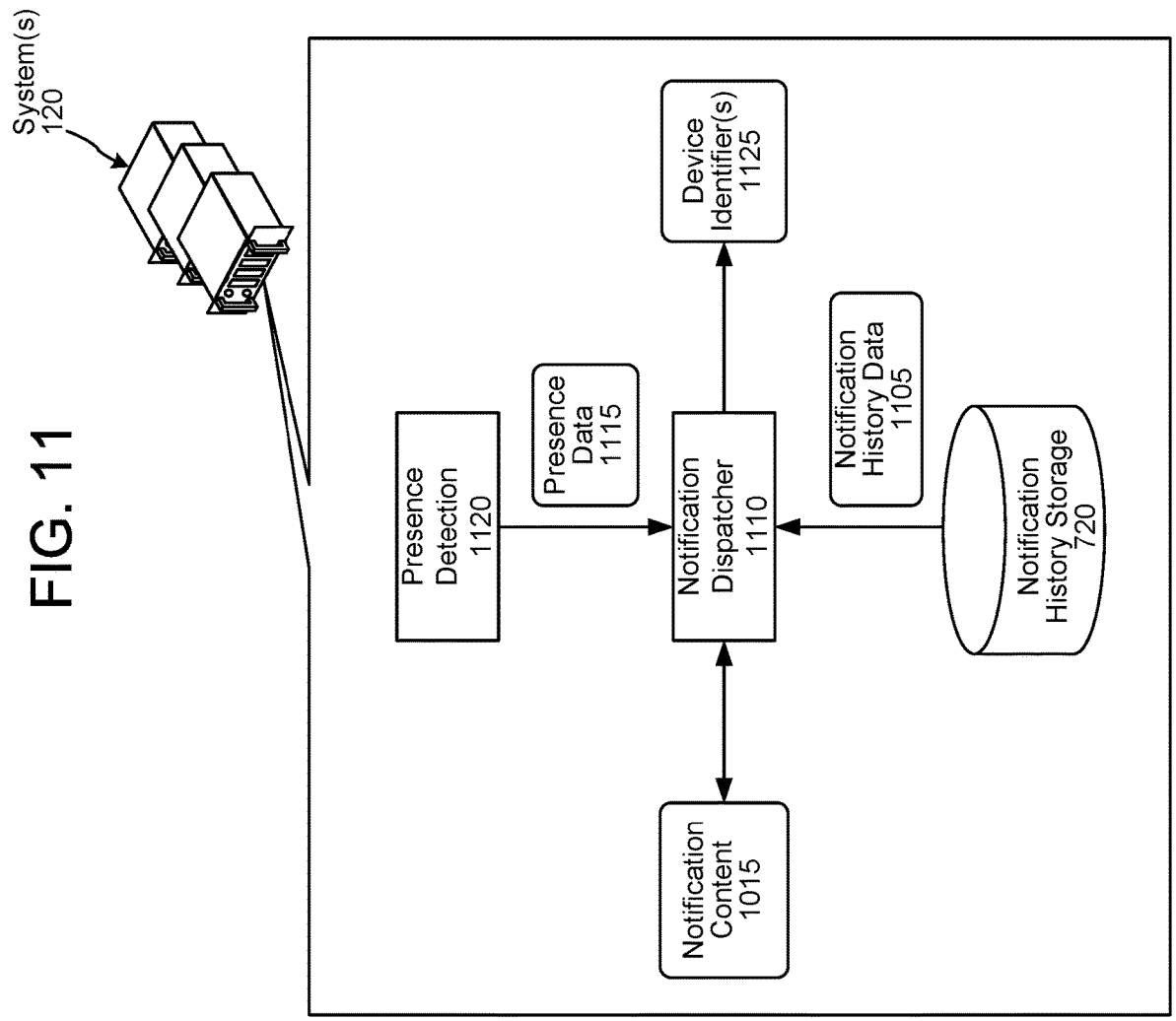
FIG. 11 is a system flow diagram illustrating how a notification may be dispatched according to embodiments of the present disclosure.

The system(s) 120 may not guarantee delivery of a notification to an intended recipient user. The system(s) 120 may be configured to perform what the system(s) 120 determines to be in the best interest of the intended recipient user. The system(s) 120 may include a notification dispatcher 1110 configured to determine whether notification content 1015 should be output to an intended recipient user (as illustrated in FIG. 11). The notification dispatcher 1110 may determine such based on various parameters, both those explicitly detailed below and others.

The notification dispatcher 1110 may determine whether to output notification content 1015 to a user based on a frequency at which the user has received notifications. The notification dispatcher 1110 may query the notification history storage 720 for notification history data 1105 associated with the user identifier, associated with the notification content 1015 and corresponding to the intended recipient user. The notification history data 1105 may represent previous notifications that were output to the user as well as when those notifications were output to the user. The notification dispatcher 1110 may determine a frequency (e.g., a number of notifications per a unit of time) at which notifications have been output to the user. Such frequency determination may be limited to a past period of time (e.g., a past day, a past week, a past month, etc.). The notification dispatcher 1110 may determine whether the frequency satisfies a condition (e.g., a threshold frequency). If the notification dispatcher 1110 determines the frequency satisfies the condition, the notification dispatcher 1110 may prevent the notification content 1015 from being output to the intended recipient user.

The notification dispatcher 1110 may determine whether to output notification content 1015 to a user based on substantive content of notifications that have been output to the user. The notification dispatcher 1110 may query the notification history storage 720 for notification history data 1105 associated with the user identifier, associated with the notification content 1015 and corresponding to the intended recipient user. The notification history data 1105 may represent previous notifications that were output to the user as well as their respective substantive content(s). The notification dispatcher 1110 may determine whether the current notification content 1015 was output to the user within a past threshold amount of time (e.g., within the past minute, within the past hour, etc.). If the notification dispatcher 1110 determines the notification content 1015 was output to the user within the past threshold amount of time, the notificationdispatcher 1110 may prevent the notification content 1015 from being output to the intended recipient user.

The notification dispatcher 1110 may determine whether to output notification content 1015 to a user based on data types that have been output to the user. The notification dispatcher 1110 may query the notification history storage 720 for notification history data 1105 associated with the user identifier, associated with the notification content 1015 and corresponding to the intended recipient user. The notification history data 1105 may represent previous notifications that were output to the user as well as their respective data types. The notification dispatcher 1110 may identify the previous notifications, in the notification history data 1105, associated with a data type corresponding to the present data type (corresponding to the data 307). The notification dispatcher 1110 may determine whether the user has responded to those notifications in the past. If the notification dispatcher 1110 determines the user has not responded to the notifications in the past, the notification dispatcher 1110 may prevent the notification content 1015 from being output to the intended recipient user.

Figure 12:
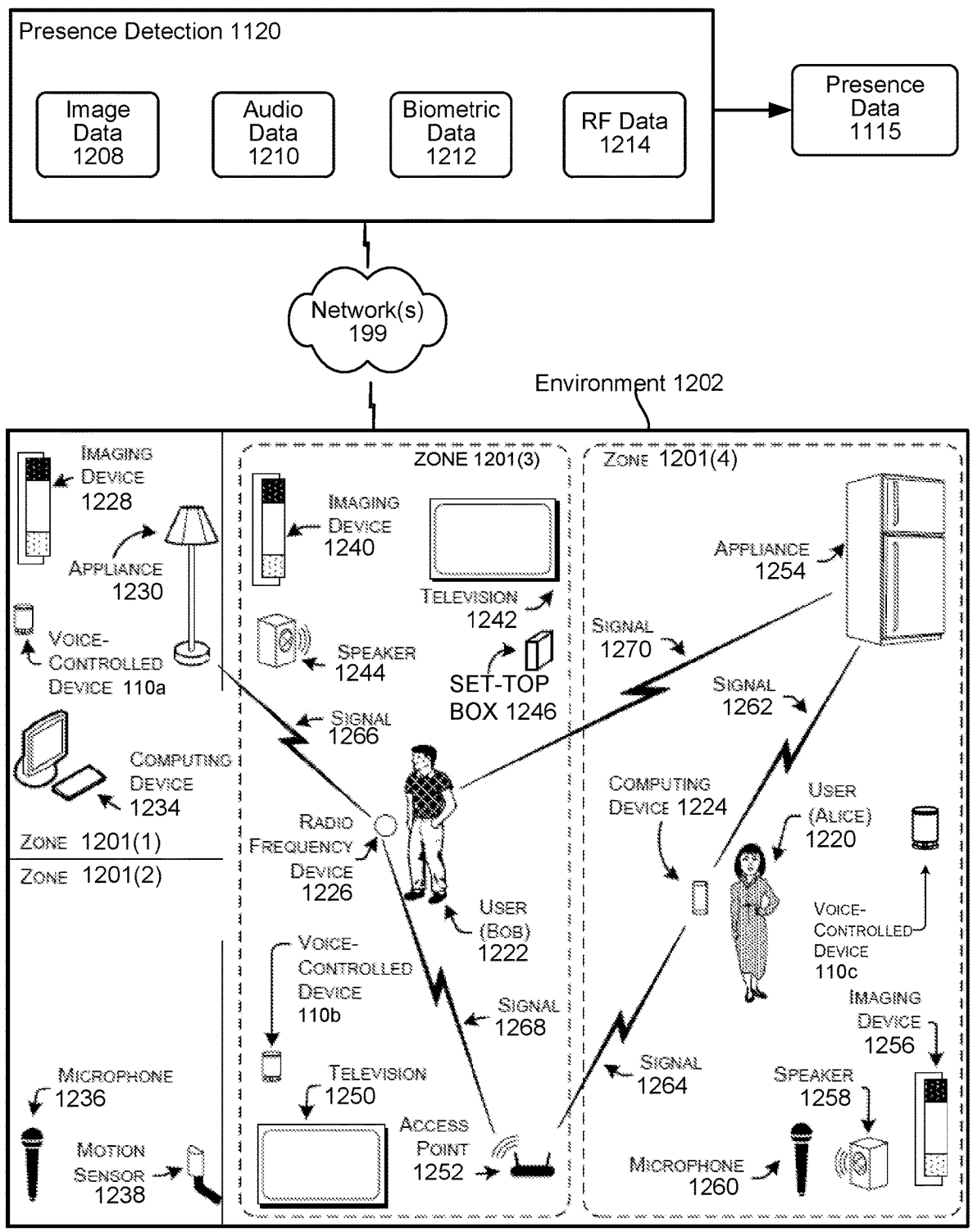
FIG. 12 is a schematic diagram of an illustrative architecture in which sensor data is combined to determine locations of users according to embodiments of the present disclosure.

The system(s) 120 may include a presence detection component 1120 configured to detect and indicate presence of one or more users of the system(s) 120 (as illustrated in FIG. 12). The present detection component 1120 may receive various presence signals from various sources. As illustrated in FIG. 12, the presence detection component 1120 may receive image data 1208, audio data 1210, biometric data 1212, and radio frequency (RF) data 1214 (as well as other data not illustrated). The presence detection component 1120 may output the presence data 1115, which may represent a single received signal or multiple received signals. Each signal, represented in the presence data 1115, may be associated with a respective device identifier of the device that originated the signal and/or user identifier and/or location identifier.

In some instances, an environment 1202 may represent a home or office associated with a user 1220 "Alice" and/or a user 1222 "Bob." In some instances, the user 1220 "Alice" may be associated with a computing device 1224, such as a smartphone. In some instances, the user 1222 "Bob" may be associated with a radio frequency device 1226, such as a wearable device (e.g., a smartwatch) or an identifier beacon.

The environment 1202 may include, but is not limited to, a number of devices that may be used to locate a user. For example, within zone 1201(1), the environment 1202 may include an imaging device 1228, an appliance 1230, a voice-controlled device 110a, and a computing device 1234. Within zone 1201(2), the environment 1202 may include a microphone 1236 and a motion sensor 1238. Within zone 1201(3), the environment may include an imaging device 1240, a television 1242, a speaker 1244, a set-top box 1246, a voice-controlled device 110b, a television 1250, and an access point 1252. Within zone 1201(4), the environment 1202 may include an appliance 1254, an imaging device 1256, a speaker 1258, a voice-controlled device 110c, and a microphone 1260.

In some instances, the presence detection component 1120 may receive image data 1208 from one or more sensors capable of providing images (e.g., such as the imaging devices 1228, 1240, 1256 and the computing devices 1224 and 1234) or sensors indicating motion (e.g., such as the motion sensor 1238).

In some instances, the presence detection component 1120 may receive biometric data 1212 representing fingerprints, iris or retina scans, thermal scans, weights of users, a size of a user, pressure (e.g., within floor sensors), etc.

In some instances, the presence detection component 1120 may receive RF data 1214. For example, the computing device 1224 may emit RF signals (e.g., Wi-Fi, Bluetooth®, etc.), which are illustrated as signals 1262 and 1264. The appliance 1254 may detect the signal 1262 and the access point 1252 may detect the signal 1264. In some instances, the access point 1252 and the appliance 1254 may send, to the presence detection component 1120, RF data 1214 representing the strength of the signals 1264 and 3612622 (e.g., as a received signal strength indication (RSSI)), respectively. In some instances, the RF data 1214 may represent a RF signal is associated with a mobile device that is associated with a particular user. In some instances, a device (e.g., the access point 1252) may be configured with multiple antennas to determine a location of a user relative to the device using beamforming or spatial diversity techniques. In such a case, the RF data 1214 may indicate a direction of the user relative to an individual device.

As illustrated, the appliance 1230 may receive a signal 1266 from the RF device 1226 associated with the user and a user profile, while the access point 1252 may receive a signal 1268. Further, the appliance 1254 can receive a signal 1270 from the RF device 1226. In an example where there is some uncertainty about an identity of the users in zones 1201(3) and 1201(4), the RSSI of the signals 1262, 1264, 1266, 1268, and/or 1270 may be used to increase or decrease a confidence level of an identity and/or location of the users, such as the user 1220 and 1222. For example, if an RSSI of the signal 1262 is higher than the RSSI of the signal 1270, the system may determine that it is more likely that a user in the zone 1201(4) is the user 1220 than the user 1222. In some instances, a confidence level of the determination may depend on a relative difference of the RSSIs, for example.

In some instances a device 110 may include some RF or other detection processing capabilities so that a user who speaks an utterance may scan, tap, or otherwise acknowledge his/her personal device (such as a phone) to a sensing device in the environment 1202. In this manner the user may "register" with the system for purposes of the system determining who spoke a particular utterance. Such a registration may occur prior to, during, or after speaking of an utterance.

In some instances, the presence detection component 1120 may receive audio data 1210 from one or more sensors capable of providing an audio signal (e.g., the voice-controlled devices 110*a-c*, the microphones 1236 and 1260, the computing devices 1224 and 1234, the set-top box 1246). The audio data 1210 may represent speech of a user. The audio data 1210 may also represent environmental noise surrounding a device (for purposes of determining whether a user is in the device's surroundings even though the user may not be talking). In some instances, the imaging devices 1228, 1240, and 1256 may provide the audio data 1210. In some instances, the presence detection component 1120 may receive audio data 1210 from one or more devices. In some instances, if multiple sources of audio are available, the system may determine that two audio signals correspond to the same source of sound, and may compare the relative amplitudes or volumes of the audio signal to determine a location of the source of sound. In some instances, individual devices may include multiple microphones and may determine a direction of a user with respect to an individual device.

Referring back to FIG. 11, the notification dispatcher 1110 may determine which user device 110 should be used to output the notification content 1015. The notification dispatcher 1110 may query a user profile storage or device profile storage for device identifiers associated with the user identifier, corresponding to the intended recipient user. The notification dispatcher 1110 may query the presence detection component 1120 for presence data 1115 associated with the device identifiers. The presence data 1115 may represent which devices (corresponding to the device identifiers) are presently detecting presence of a user (are likely proximate to the user). The presence detection component 1110 may output a device identifier(s) 1125 representing the device(s) 110 that should be used to output the notification content 1015. For example, if the presence detection component 1110 determines the presence data 1115 represents there are no devices in the user's household that are detecting a user, the notification dispatcher 1110 may determine the user's smart phone, tablet, etc. (e.g., a non-household device) should be used to output the notification content 1015. Other examples are possible.

The notification dispatcher 1110 may cause the device identifier(s) 1125 and the notification content 1015 to be sent to a service(s) of the system(s) 120 that is capable of sending the notification content 1015 to the device(s) 110 corresponding to the device identifier(s) 1125. For example, if the notification content 1015 is to be output using a notification modality, the notification dispatcher 1110 may cause the notification content 1015 and device identifier(s) 1125 to be sent to a notification service, which may be embodied as a skill. For further example, if the notification content 1015 is to be output as a SMS message or email, the notification dispatcher 1110 may cause the notification content 1015 and device identifier(s) 1125 to be sent to a communications service, which may be embodied as a skill. The notification dispatcher 1110 may send the notification content 1015 and device identifier(s) 1125 to an orchestrator of the system(s) 120, and the orchestrator may send the notification content 1015 and device identifier(s) 1125 to the service(s).

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As described above, the system(s) 120 may include a notification controller 360 configured to determine whether a notification, corresponding to the data 307 should be output to a user(s). The notification controller 360, in at least some implementations, may be configured to determine whether a routine is to be executed in response to the data 307. The notification controller 360 may determine a user identifier (corresponding to an intended recipient of the data 307) and may determine whether the user identifier is associated with a routine that is likewise associated with the data type (corresponding to the data 307). If the notification controller 360 determines the user identifier is associated with a routine associated with the data type, the notification controller 306 may cause one or more components of the system(s) 120 to perform actions defined by the routine.

In at least some examples, the data 305 may be associated with a group profile identifier (e.g., corresponding to users and devices of a household). A group profile identifier may be associated with a variety of types of user profile identifiers (e.g., adult profile identifier, child profile identifiers, etc.). The system(s) 120 (e.g., the notification dispatcher 1110) may consider profile type when determine which devices and users to route notifications to. For example, although data 305 may be associated with a group profile identifier, the system(s) 120 may be configured to prevent a corresponding notification from being output using devices associated with a child profile identifier encompassed under the group profile identifier.

Figure 13:
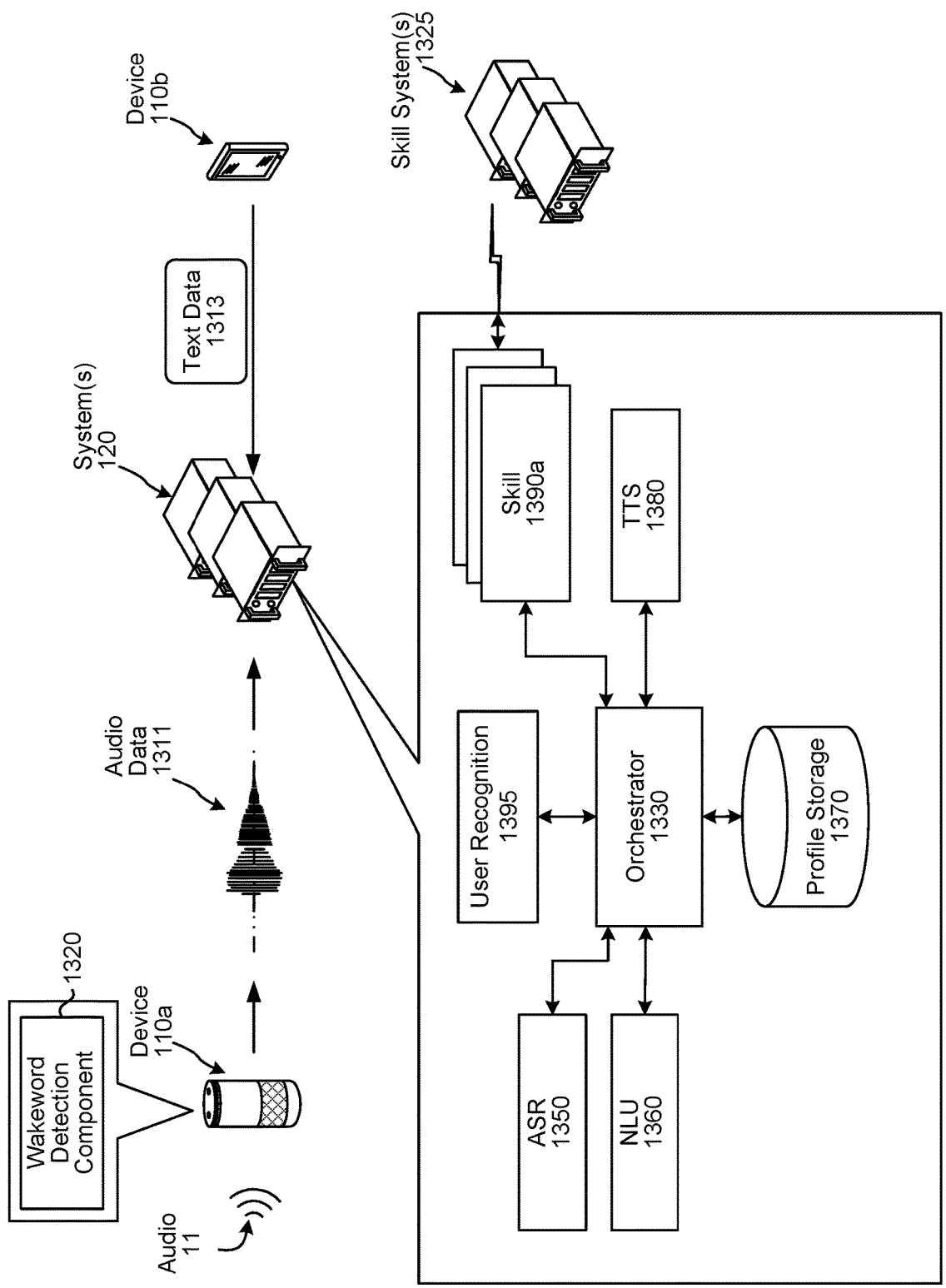
FIG. 13 is a conceptual diagram of components of a system according to embodiments of the present disclosure.

The overall system of the present disclosure may operate using various components as illustrated in FIG. 13. The various components may be located on same or different physical devices. Communication between various components may occur directly or across a network(s) 199.

An audio capture component(s), such as a microphone or array of microphones of a device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 1320 to perform wakeword detection to determine when a user intends to speak an input to the device 110a. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 1320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1320 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 1311, representing the audio 11, to the system(s) 120. The audio data 1311 may include data corresponding to the wakeword, or the portion of the audio corresponding to the wakeword may be removed by the device 110a prior to sending the audio data 1311 to the system(s) 120.

Upon receipt by the system(s) 120, the audio data 1311 may be sent to an orchestrator component 1330. The orchestrator component 1330 may include memory and logic that enables the orchestrator component 1330 to transmit various pieces and forms of data to various components of the system, as well as perform other operations as described herein.

The orchestrator component 1330 sends the audio data 1311 to an ASR component 1350. The ASR component 1350 transcribes the audio data 1311 into text data. The text data output by the ASR component 1350 represents one or more than one (e.g., in the form of an N-best list) ASR hypotheses representing speech represented in the audio data 1311. The ASR component 1350 interprets the speech in the audio data 1311 based on a similarity between the audio data 1311 and pre-established language models. For example, the ASR component 1350 may compare the audio data 1311 with models for sounds (e.g., subword units, such as phonemes, etc.) and sequences of sounds to identify words that match the sequence of sounds of the speech represented in the audio data 1311. The ASR component 1350 outputs text data representing one or more ASR hypotheses. The text data output by the ASR component 1350 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated.

A device 110*b* may receive a text-based user input. The device 110*b* may generating text data 1313 representing the text-based user input. The device 110 may send the text data 1313 to the system(s) 120. Upon receipt by the system(s) 120, the text data 1313 may be sent to the orchestrator component 1330. The orchestrator component 1330 may send text data (e.g., text data output by the ASR component 1350 or the received text data 1313) to the NLU component 1360.

The NLU component 1360 receives attempts to make a semantic interpretation of the text data input therein. That is, the NLU component 1360 determines one or more meanings associated with the phrase(s) or statement(s) represented in the text data based on words represented in the text data. The NLU component 1360 determines an intent representing an action that a user desires be performed as well as pieces of the text data that allow a device (e.g., the device 110, the system(s) 120, a skill 1390, a skill system(s) 125, etc.) to execute the intent. For example, if the text data corresponds to "play Adele music," the NLU component 1360 may determine an intent that the system(s) 120 output music and may identify "Adele" as an artist. For further example, if the text data corresponds to "what is the weather," the NLU component 1360 may determine an intent that the system(s) 120 output weather information associated with a geographic location of the device 110. In another example, if the text data corresponds to "turn off the lights," the NLU component 1360 may determine an intent that the system(s) 120 turn off lights associated with the device(s) 110 or the user(s) 5.

The NLU component 1360 may send NLU results data (which may include tagged text data, indicators of intent, etc.) to the orchestrator component 1330. The orchestrator component 1330 may send the NLU results data to a skill(s) 1390. If the NLU results data includes a single NLU hypothesis, the orchestrator component 1330 may send the NLU results data to the skill(s) 1390 associated with the NLU hypothesis. If the NLU results data includes an N-best list of NLU hypotheses, the orchestrator component 13330 may send the top scoring NLU hypothesis to a skill(s) 1390 associated with the top scoring NLU hypothesis.

A "skill" may be software running on the system(s) 120 that is akin to a software application running on a traditional computing device. That is, a skill 1390 may enable the system(s) 120 to execute specific functionality in order to provide data or produce some other requested output. The system(s) 120 may be configured with more than one skill 1390. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 1390 may operate in conjunction between the system(s) 120 and other devices, such as the device 110, in order to complete certain functions. Inputs to a skill 1390 may come from speech processing interactions or through other interactions or input sources. A skill 1390 may include hardware, software, firmware, or the like that may be dedicated to a particular skill 1390 or shared among different skills 1390.

In addition or alternatively to being implemented by the system(s) 120, a skill 1390 may be implemented by a skill system(s) 125. Such may enable a skill system(s) 125 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 1390 dedicated to interacting with more than one skill system 125.

Unless expressly stated otherwise, reference to a skill, skill device, or skill component may include a skill 1390 operated by the system(s) 120 and/or skill operated by the skill system(s) 125. Moreover, the functionality described herein as a skill may be referred to using many different terms, such as an action, bot, app, or the like.

The system(s) 120 may include a TTS component 1380 that generates audio data (e.g., synthesized speech) from text data using one or more different methods. Text data input to the TTS component 1380 may come from a skill 1390, the orchestrator component 1330, or another component of the system(s) 120.

In one method of synthesis called unit selection, the TTS component 1380 matches text data against a database of recorded speech. The TTS component 1380 selects matching units of recorded speech and concatenates the units together to form audio data. In another method of synthesis called parametric synthesis, the TTS component 1380 varies parameters such as frequency, volume, and noise to create audio data including an artificial speech waveform. Parametric synthesis uses a computerized voice generator, sometimes called a vocoder.

The system(s) 120 may include profile storage 1370. The profile storage 1370 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 1370 may include one or more user profiles, with each user profile being associated with a different user identifier. Each user profile may include various user identifying information. Each user profile may also include preferences of the user and/or one or more device identifiers, representing one or more devices registered to the user.

The profile storage 1370 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 1370 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 14:
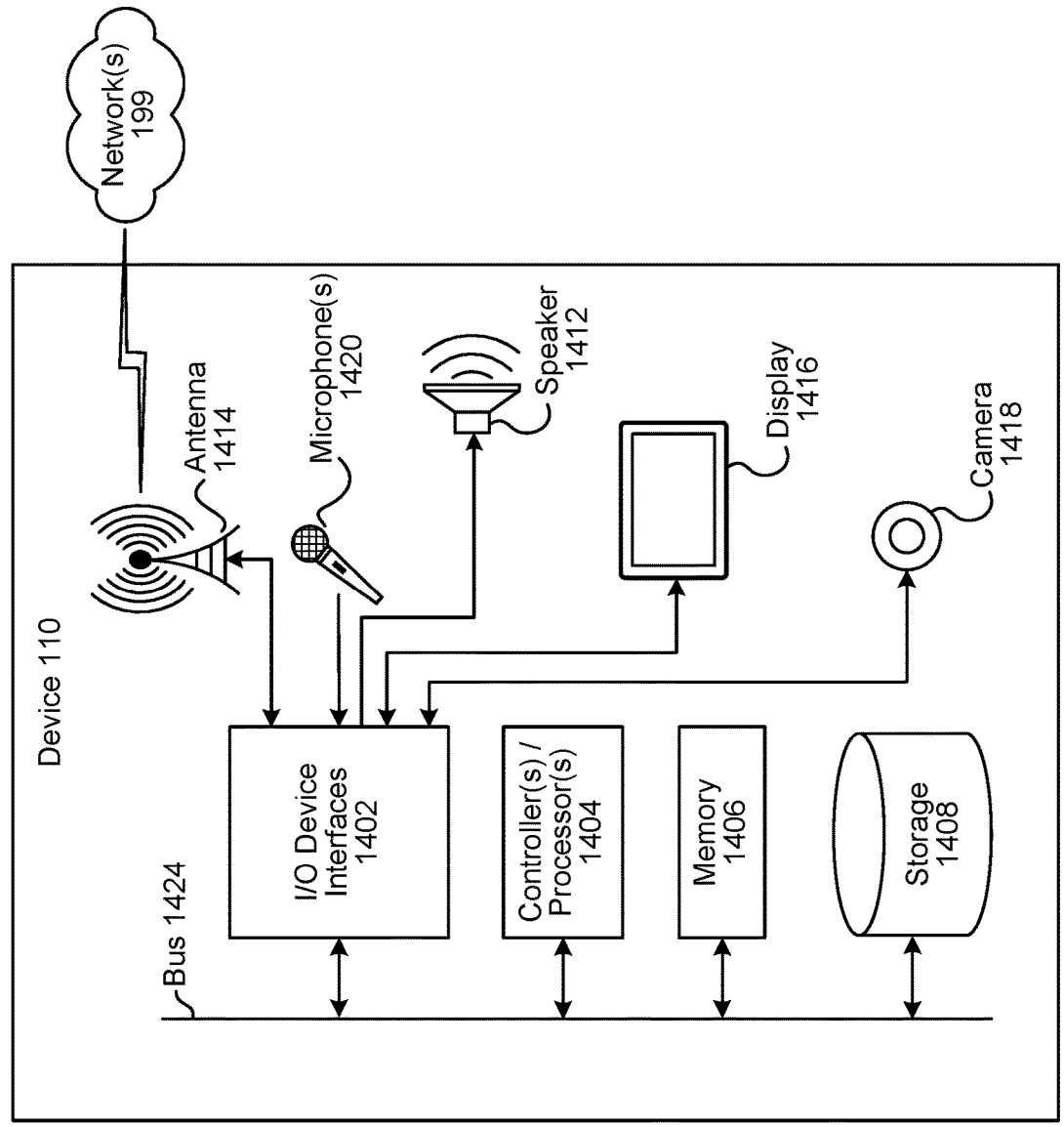
FIG. 14 is a block diagram conceptually illustrating example components of a device according to embodiments of the present disclosure.
Figure 15:
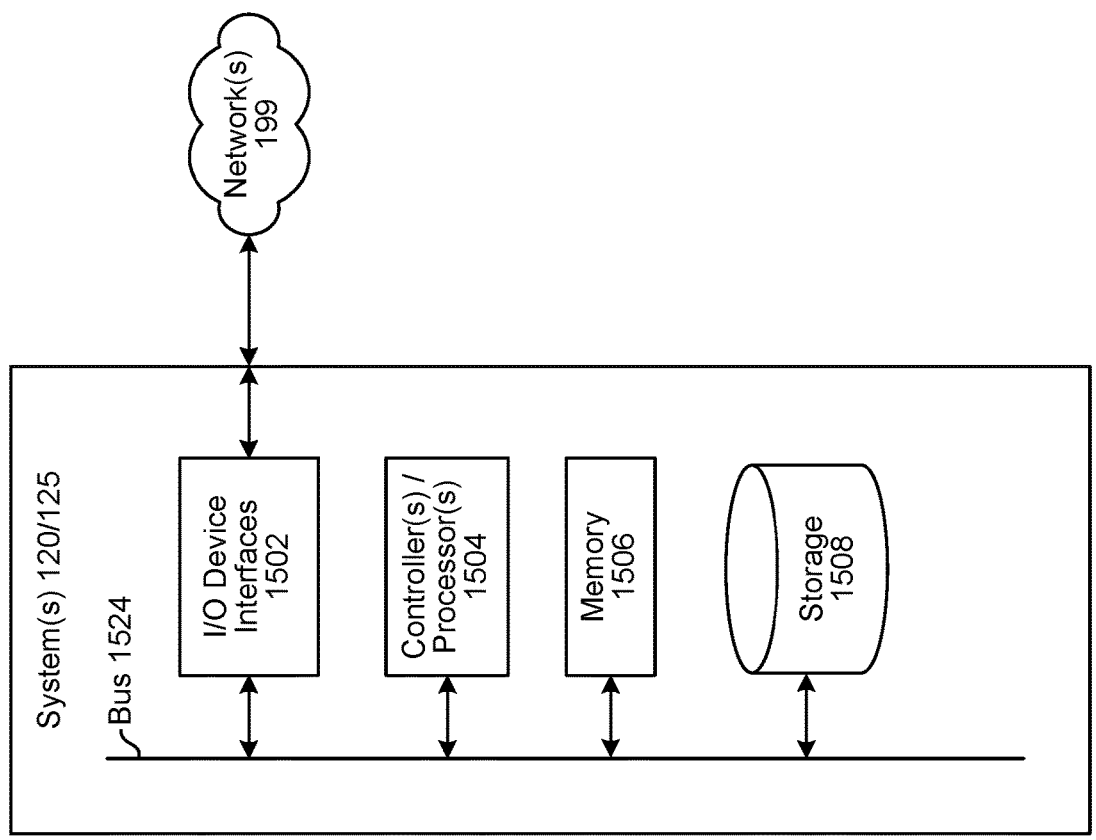
FIG. 15 is a block diagram conceptually illustrating example components of a server according to embodiments of the present disclosure.

FIG. 14 is a block diagram conceptually illustrating a device 110 that may be used with the system. FIG. 15 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (1402/1502), processor(s) (1404/1504), memory (1406/1506), and/or storage (1408/1508) of the device(s) 110 system(s) 120, or the skill system(s) 125, respectively. Thus, the ASR component 1350 may have its own I/O interface(s), processor(s), memory, and/or storage; the NLU component 1360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 16:
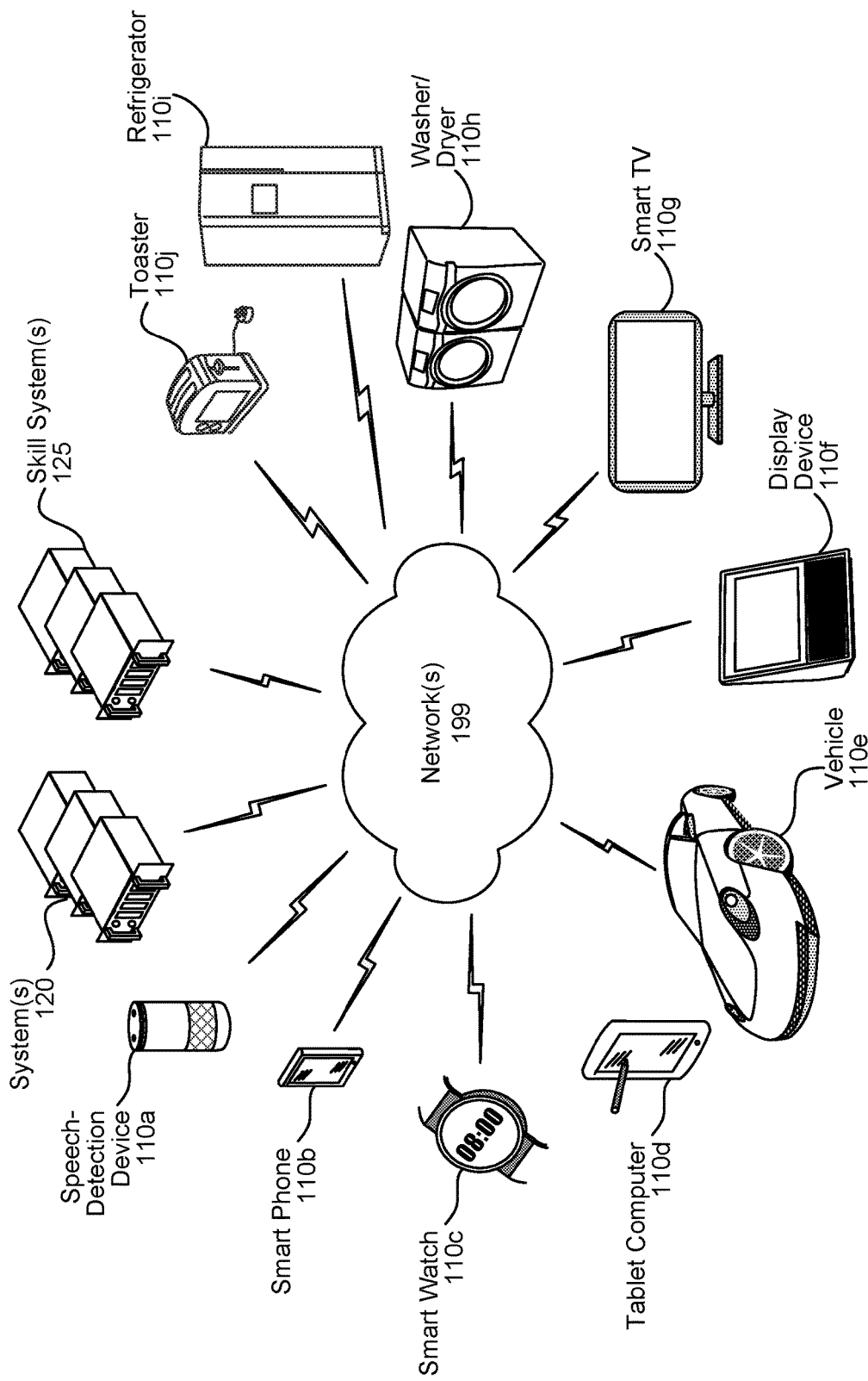
FIG. 16 illustrates an example of a computer network for use with the speech processing system.

As illustrated in FIG. 16, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1350, the NLU component 1360, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a skill, first data representing a push event, the first data including a user identifier, a type identifier, and first content to be sent in absence of a user input requesting the first content;
determining, associated with the user identifier, a user preference for receiving content corresponding to the type identifier;
determining, using the user preference, a modality for outputting the first content;
determining a template associated with the type identifier, the template representing how the first content is to be rendered for output using the modality;
determining a data field associated with the type identifier;
determining the first data includes at least a portion corresponding to the data field;
based at least in part on the first data including the at least a portion corresponding to the data field, generating second content including the first content using the template;
determining a first device identifier associated with the user identifier, the first device identifier representing a first device;
determining a second device identifier associated with the user identifier, the second device identifier representing a second device;
receiving first presence data associated with the first device identifier, the first presence data representing a user was detected by the first device;
determining a communications component configured to send the second content to the first device;
sending, to the communications component, the second content; and sending, to the communications component, the first device identifier.

2. The method of claim 1, further comprising:
receiving, from one of the first device or the second device, second data representing a user input;
determining the second data corresponds to a permission to send content corresponding to the type identifier, the type identifier being unspecific to any particular data source;
storing an association between the user identifier and the second data;
prior to determining the modality, using the user identifier and the association to identify the second data; and
determining the type identifier corresponds to both the first data and the second data.

3. The method of claim 1, further comprising:
receiving, from the skill, second data representing a second push event, the second data including a second event type indicator and third content;
determining the second data is associated with a group profile identifier, the group profile identifier being associated with the user identifier and a second user identifier;
determining the second user identifier corresponds to a user profile type;
based at least in part on the second user identifier corresponding to the user profile type, determining a device, associated with the second user identifier, is to be removed from outputting the third content; and
causing the first device to output the third content.

4. The method of claim 1, further comprising:
determining notification history data associated with the user identifier, the notification history data representing a plurality of previous notifications;
determining the notification history data represents a first previous notification corresponding to the modality;
determining the notification history data represents a previous user input was received with respect to the first previous notification, the previous user input corresponding to a request to view the first previous notification; and
based at least in part on the previous user input corresponding to the request, determining the modality is to be used to output the first content.

5. A method, comprising:
receiving, from a data source, first data corresponding to a data type and including a user identifier;
determining, based at least in part on the data type, that the first data is to be output as a notification;
determining a data field associated with the data type;
determining the first data includes at least a portion corresponding to the data field;
based at least in part on the first data including the at least a portion corresponding to the data field, generating, based at least in part on the first data, a first notification;
determining a modality for outputting the first notification;
determining a first device identifier associated with the user identifier, the first device identifier representing a first device;
determining a communications component configured to send the first notification to the first device;
sending, to the communications component, the first notification; and
sending, to the communications component, the first device identifier.

6. The method of claim 5, further comprising:
receiving, from the first device, second data representing a user input;
determining the second data corresponds to a permission to send notifications corresponding to a data type;
storing an association between the user identifier and the second data;
prior to determining the modality, using the user identifier and the association to identify the data type; and
determining the first data corresponding to the data type.

7. The method of claim 5, further comprising:
receiving, from the data source, second data;
determining user identifiers are missing from the second data;
determining a data source identifier corresponding to the data source;
determining a first association between the data source identifier and a second user identifier, the first association representing a first user has enabled the data source to output notifications to the first user;
determining a second association between the data source identifier and a third user identifier, the second association representing a second user has enabled the data source to output notifications to the second user;
determining a second modality for outputting a second notification to the first user, the second notification corresponding to the second data;
determining a third modality for outputting a third notification to the second user, the third notification corresponding to the second data;
causing the second notification to be output to the first user using the second modality; and
causing the third notification to be output to the second user using the third modality.

8. The method of claim 5, further comprising:
determining a schema associated with the data type, wherein:
the schema defines a plurality of data fields associated with the data type,
the plurality of data fields includes the data field, and
generating the first notification is additionally based on determining the first data includes portions respectively corresponding to each of the plurality of data fields.

9. The method of claim 5, further comprising:
determining a template associated with the data type, the template representing how the first data is to be rendered for output using the modality; and
using the template, generating the first notification.

10. The method of claim 5, further comprising:
determining, associated with the user identifier, a user preference for receiving the first data; and
based at least in part on the user preference, determining the modality.

11. The method of claim 5, further comprising:
determining notification history data associated with the user identifier;
determining the notification history data represents a user input was received in response to outputting a second notification using the modality; and
determining the modality based at least in part on determining the notification history data represents the user input was received in response to outputting the second notification using the modality.

12. The method of claim 5, further comprising:
receiving, from the data source, second data including a second user identifier;

determining notification history data associated with the second user identifier;
determining, using the notification history data, a number times notifications have been output within a past amount of time;
determining the number of times satisfies a condition; and
based at least in part on determining the number of times satisfies the condition, preventing the second data from being output.

13. The method of claim 5, further comprising:
receiving second data corresponding to the data type;
determining the second data does not include at least a portion corresponding to the data field; and
based on the determining the second data does not include at least a portion corresponding to the data field, ceasing processing with respect to the second data.

14. The method of claim 5, wherein the data type is a first data type, the method further comprising:
determining that the data source is authorized to send data of the first data type, wherein generating the first notification is further based on the determining that the data source is authorized to send data of the first data type;
receiving, from the data source, second data corresponding to a second data type;
determining that the data source is not authorized to send data of the second data type; and
based on the determining that the data source is not authorized to send data of the second data type, ceasing processing with respect to the second data.

15. A system, comprising:
at least one processor; and
at least one memory comprising instructions that, when executed by the at least one processor, cause the system to:
receive, from a data source, first data corresponding to a data type and including a user identifier;
determine, based at least in part on the data type, that the first data is to be output as a notification;
determine a data field associated with the data type;
determine the first data includes at least a portion corresponding to the data field;
based at least in part on the first data including the at least a portion corresponding to the data field, generate, based at least in part on the first data, a first notification;
determine a modality for outputting the first notification;
determine a first device identifier associated with the user identifier, the first device identifier representing a first device;
determine a communications component configured to send the first notification to the first device;
send, to the communications component, the first notification; and
send, to the communications component, the first device identifier.

16. The system of claim 15, wherein the at least one memory further comprises instructions that, when executed by the at least one processor, further cause the system to:
receive, from the first device, second data representing a user input;
determine the second data corresponds to a permission to send notifications corresponding to a data type;
store an association between the user identifier and the second data;
prior to determining the modality, use the user identifier and the association to identify the data type; and
determine the first data corresponding to the data type.

17. The system of claim 15, wherein the at least one memory further comprises instructions that, when executed by the at least one processor, further cause the system to:
receive, from the data source, second data;
determine user identifiers are missing from the second data;
determine a data source identifier corresponding to the data source;
determine a first association between the data source identifier and a second user identifier, the first association representing a first user has enabled the data source to output notifications to the first user;
determine a second association between the data source identifier and a third user identifier, the second association representing a second user has enabled the data source to output notifications to the second user;
determine a second modality for outputting a second notification to the first user, the second notification corresponding to the second data;
determine a third modality for outputting a third notification to the second user, the third notification corresponding to the second data;
cause the second notification to be output to the first user using the second modality; and
cause the third notification to be output to the second user using the third modality.

18. The system of claim 15, wherein the at least one memory further comprises instructions that, when executed by the at least one processor, further cause the system to:
determine a schema associated with the data type, wherein:
the schema defines a plurality of data fields associated with the data type,
the plurality of data fields includes the data field, and
the instructions further cause the system go generate the first notification additionally based on determining the first data includes portions respectively corresponding to each of the plurality of data fields.

19. The system of claim 15, wherein the at least one memory further comprises instructions that, when executed by the at least one processor, further cause the system to:
determine a template associated with the data type, the template representing how the first data is to be rendered for output using the modality; and
using the template, generate the first notification.

20. The system of claim 15, wherein the at least one memory further comprises instructions that, when executed by the at least one processor, further cause the system to:
determine, associated with the user identifier, a user preference for receiving the first data; and
based at least in part on the user preference, determine the modality.

21. The system of claim 15, wherein the at least one memory further comprises instructions that, when executed by the at least one processor, further cause the system to:
determine notification history data associated with the user identifier;
determine the notification history data represents a user input was received in response to outputting a second notification using the modality; and
determine the modality based at least in part on determining the notification history data represents the user input was received in response to outputting the second notification using the modality.

22. The system of claim 15, wherein the at least one memory further comprises instructions that, when executed by the at least one processor, further cause the system to:
- receive, from the data source, second data including a second user identifier;
- determine notification history data associated with the second user identifier;
- determine, using notification history data, a number times notifications have been output within a past amount of time;
- determine the number of times satisfies a condition; and
- based at least in part on determining the number of times satisfies the condition, prevent the second data from being output.

23. The system of claim 15, wherein the at least one memory further comprises instructions that, when executed by the at least one processor, further cause the system to:
- receive second data corresponding to the data type;
- determine the second data does not include at least a portion corresponding to the data field; and
- based on the determining the second data does not include at least a portion corresponding to the data field, cease processing with respect to the second data.

24. The system of claim 15, wherein the data type is a first data type, and the at least one memory further comprises instructions that, when executed by the at least one processor, further cause the system to:
- determine that the data source is authorized to send data of the first data type, wherein generating the first notification is further based on the determining that the data source is authorized to send data of the first data type;
- receive, from the data source, second data corresponding to a second data type;
- determine that the data source is not authorized to send data of the second data type; and
- based on determining that the data source is not authorized to send data of the second data type, cease processing with respect to the second data.

* * * * *